US006888927B1

(12) United States Patent
Cruickshank et al.

(10) Patent No.: US 6,888,927 B1
(45) Date of Patent: May 3, 2005

(54) GRAPHICAL MESSAGE NOTIFICATION

(75) Inventors: Brian Cruickshank, Oakville (CA); Paul Michael Brennan, Toronto (CA); John Eric Lumsden, Toronto (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/220,962

(22) Filed: Dec. 28, 1998

(51) Int. Cl.[7] .............................................. H04M 1/64
(52) U.S. Cl. .................... 379/88.11; 379/88.12; 379/88.19; 379/88.21; 379/142.06; 379/207.15; 379/88.13; 379/88.17; 379/88.25; 379/93.23; 455/412.2
(58) Field of Search ......................... 379/88.11, 88.12, 379/88.19, 88.13, 142.06, 207.15, 88.17, 88.25, 93.23, 67, 88.21, 93.03, 93.01, 142.01, 88.22, 93.21; 455/412.2

(56) References Cited

U.S. PATENT DOCUMENTS

| | | | | |
|---|---|---|---|---|
| 5,461,488 A | * | 10/1995 | Witek ......................... 358/402 |
| 5,497,373 A | | 3/1996 | Hulen et al. .................. 370/79 |
| 5,568,540 A | * | 10/1996 | Greco et al. ............. 379/88.25 |
| 5,651,054 A | * | 7/1997 | Dunn et al. ............... 379/88.11 |
| 5,675,507 A | * | 10/1997 | Bobo, II ................... 348/14.12 |
| 5,724,412 A | * | 3/1998 | Srinivasan ............... 379/93.23 |
| 5,761,279 A | | 6/1998 | Bierman et al. ......... 379/93.23 |
| 5,764,731 A | * | 6/1998 | Yablon ..................... 379/88.15 |
| 5,778,053 A | * | 7/1998 | Skarbo et al. ........... 379/93.21 |
| 5,778,054 A | * | 7/1998 | Kimura et al. ........... 379/93.23 |
| 5,875,239 A | * | 2/1999 | Koralewski et al. ... 379/142.15 |
| 5,907,604 A | * | 5/1999 | Hsu ....................... 379/142.06 |
| 5,937,050 A | * | 8/1999 | Yue et al. ............... 379/100.06 |
| 5,946,386 A | * | 8/1999 | Rogers et al. .............. 379/265 |
| 6,038,296 A | * | 3/2000 | Brunson et al. ....... 379/100.11 |
| 6,122,348 A | * | 9/2000 | French-St. George et al. ... 379/88.23 |
| 6,137,489 A | | 10/2000 | Ohishi |
| 6,233,318 B1 | * | 5/2001 | Picard et al. ............ 379/88.17 |
| 6,252,588 B1 | * | 6/2001 | Dawson ..................... 345/752 |
| 6,282,270 B1 | * | 8/2001 | Porter .................... 379/88.17 |
| 6,317,757 B1 | * | 11/2001 | Sakamaki ................... 715/502 |

FOREIGN PATENT DOCUMENTS

| | | |
|---|---|---|
| EP | 741484 A2 | 11/1996 |
| GB | 2319431 A | 5/1998 |
| WO | WO 98/58332 | 12/1998 |

OTHER PUBLICATIONS

IETF Internet Draft, "Usage of H.323 on the Internet", Feb. 1997.
ITU–T Draft revision of Recommendation H.225.0, Version 2, "Media Stream Packetization and Symchronization on Non–Guaranteed Quality of Service LANs", Geneva, Mar. 1997, pp. 12–27.
Copy of European Search Report Application EP 99 31 0512.
Lie H.W. et al "SCREAM: Screen–Based Navigation in Voice Messages" Visual Languages, 1993 Proceedings 1993, IEEE Symposium on Bergen, Norway Aug. 24–27, 1993 Los Alamitos, CA, USA, IEEE Comput. Soc., US. pp. 401–405 XP010032672 ISBN: 0–8186–3970–0; p. 404.

* cited by examiner

*Primary Examiner*—Fan Tsang
*Assistant Examiner*—Simon P. Sing
(74) *Attorney, Agent, or Firm*—Mintz Levin Cohn Ferris Glovsky & Popeo PC

(57) ABSTRACT

The invention provides a method, apparatus and system for providing an addressee of a stored message with a graphical notification associated with a source of the stored message. In general terms, a communications device of the addressee is presented with the graphical notification in the form of an information signal which relates the stored message to at least one graphical image associated with the source of the stored message.

77 Claims, 12 Drawing Sheets

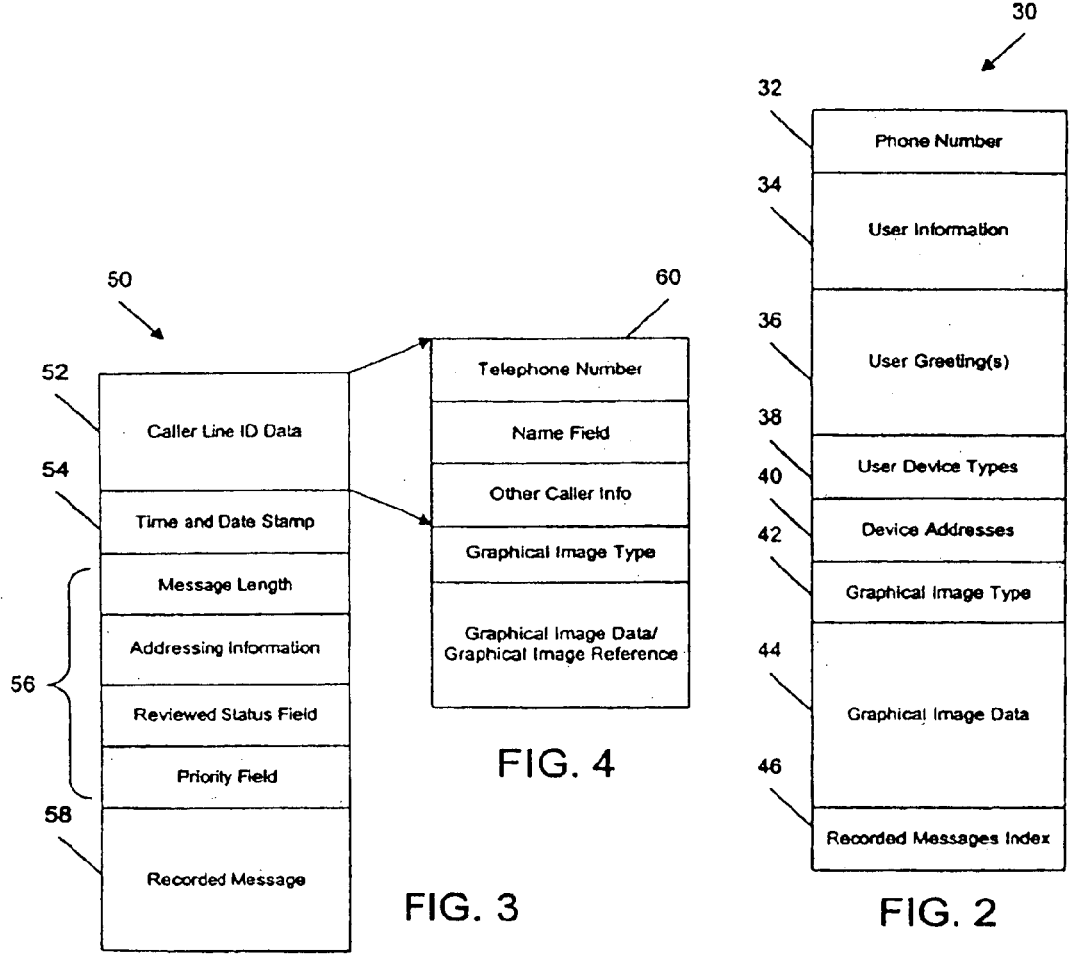

| telephone number[0] | IP address A |
|---|---|
| telephone number[1] | IP address B |
| ... | ... |
| telephone number[n] | IP address X |

266

FIG. 14 http://<Called Party Web Server IP address>:<port>/cgi-bin/<script file name>?<query parameters>

FIG. 15 http://<Caller Web Server IP address>:<port>/cgi-bin/<script file name>?<query parameters>

FIG. 16

GRAPHICAL MESSAGE NOTIFICATION

FIELD OF THE INVENTION

The present invention relates generally to messaging systems, and more particularly, to a method, apparatus and system for providing an addressee with graphical notification of a waiting message, and to a computer readable medium providing codes for directing a computer to provide same.

BACKGROUND

Electronic messaging systems, such as voice mail systems and email systems, have been widely adopted in most commercial and non-commercial arenas for storing and retrieving digitized messages. Such messaging systems require a mechanism for notifying users of unreviewed messages.

Several methods of message notification are known in the art. In conventional voice messaging systems, for instance, a subscriber may be notified that recorded messages are awaiting the subscriber's review using one of a variety of notification schemes. In some messaging systems, a display light connected to a panel of a telephone may flash on and off to identify that recorded messages await retrieval. In other instances, subscribers of voice mail systems are notified that messages are awaiting review by way of an interrupted dial tone which is transmitted from the earpiece of a phone when the subscriber picks up the receiver. While such signalling techniques provide a user with notification of a waiting message, they do not provide the user with further information identifying the party that left the message or other information related to the source of the message.

With digital display phones, a user subscribing to message waiting services receives a notification from the voice messaging server when a message has been recorded for the user. The notification typically includes a signal which triggers the display of a predefined text message, such as "MSG", on the phone display. In a number of display phones, a series of ASCII text characters are transmitted to the display phone and are displayed to notify the subscribing user of the pending messages within the user's voice mail, although in such cases, the information provided is limited to textual information identifying the caller name and/or number associated with a recorded message.

In other messaging systems, such as electronic mail (email) systems, users may log into their email accounts and download stored email. If messages are received locally, a single line of text typically identifying the sender's name, the date the message was received and the title of the message are displayed in a viewing window within the email application. In systems such as HotMail(TM) and Yahoo (TM) mail services, users connect remotely over the Internet to review email on web pages which present the user with a viewing window containing the aforementioned textual message information similar to locally managed email applications. In other cases, PC messaging servers such as Microsoft Exchange(TM) flash a small icon in the bottom of the user's screen to alert the user that a message has arrived but do not provide any indication as to who has sent the message.

Although the provision of textual information associated with a notification of waiting messages can provide the user with some information pertaining to the waiting messages, it would be desirable to deploy message waiting notification services which facilitate the ease of identifying the source of a recorded message with graphical images. It would be particularly desirable that message waiting notification systems provide graphical notifications to a called party including caller selected graphical images associated with the caller for display at the called party's end-user communications equipment.

As will be further appreciated, the continuing convergence of most forms of user traffic has spawned a growing demand for telephony messaging systems and other user messaging systems that offer communications services which leverage the opportunities presented by integrating telephony and data network infrastructures. In such a converging telecommunications market, it would be desirable that a method of graphically notifying a user of waiting messages have application to a number of communications networks, including telephony and data networks.

SUMMARY OF THE INVENTION

The above problems are addressed by providing an addressee of a stored message with a graphical notification associated with the stored message, including presenting the addressee with an information signal relating the stored message to at least one graphical image associated with the source of the stored message.

In accordance with one aspect of the invention, there is provided a method of indicating the source of the stored message to the addressee. In this aspect, an information signal is generated relating the stored message to at least one graphical image associated with the source of the stored message, and the information signal is transmitted to a communications device associated with the addressee. In this case, a representation of the one or more graphical images may be included in the information signal. Alternatively, the information signal may include a network address identifying a location where the graphical images associated with the source may be accessed, directly or indirectly, by the addressee. Such a network location may refer to any of a variety of networked resources. For instance, the network location may refer to the location of a messaging system associated with the source, the location of another network resource associated with the source such as a web page, or the location of an end-user communications device associated with the source.

The flexibility available in identifying a network location from which graphical images associated with the source of the stored message may be accessed extends further flexibility to the manner by which graphical notifications such as the information signal and the graphical image associated therewith may be retrieved and presented to the addressee's communications device. For instance, in one embodiment a request for pending notifications may be received by a messaging system from the addressee. In this embodiment, if there are any pending notifications for the addressee, they are retrieved and transmitted as information signals to the addressee's communications device. In the case where such a notification includes a network location, the addressee's communications device may be prompted by the arriving information signal to connect with the appropriate networked resources associated with the network location so as to retrieve the one or more graphical images associated with the source.

In a preferred embodiment, the communications device of the addressee is alerted that an incoming message from the source is being stored and the communications device is permitted to interrupt the storage of the incoming message and connect with the source. This mechanism provides a called party with the flexibility to connect with a communication from the calling party even when the calling party is recording a message for the called party.

In another preferred embodiment, graphical image information associated with the called party is retrieved and presented to the calling party when the calling party initiates a communication.

In another embodiment, once a message is stored, a graphical image associated with the source and pre-selected by the source is related to the stored message, giving the user the flexibility to arrange for graphical images to be presented in communications according to the type of communication and the class of recipient.

In yet another embodiment, the information signal may prompt the communications device of the addressee to connect with a networked resource associated with the network location, such as a web server application located on a network server, so as to retrieve a web page identifying one or more new graphical notifications from one or more sources. For instance, information encoded within the information signal received by an addressee may prompt the addressee's communication device to launch a web browser connecting the addressee to a web page from which pending graphical notifications are available to the addressee for review and for retrieval of associated stored messages.

Preferably, the method includes determining the source of the stored message so as to support various identification mechanisms. For instance, in one embodiment the method includes determining caller line identification information associated with the stored message, thereby offering the advantage of associating graphical notifications with subscribers of a messaging system that are identified by way of such caller line identification information.

In another embodiment the method includes determining a calling party associated with the stored message. This latter embodiment has the advantage of graphically identifying a calling party associated with a stored message independent of the subscribing communications line from which the stored message originated.

In one preferred embodiment, the method includes identifying a media type of the stored message and presenting a graphical image associated with the media type to the communications device of the addressee. In this embodiment, the addressee can be presented with both at least one graphical image associated with a calling party and a digital representation of a graphical image associated with the media type of the stored message, offering within the notification to the addressee additional graphical information associated with the calling party or subscriber of the source communications line.

In yet another embodiment, the method may include retrieving a digital representation of a sound waveform associated with the source and sending the digital representation of the sound waveform to the communications device of the addressee for presentation to the addressee along with an associated graphical notification.

In another embodiment, a representation of at least one video frame from a stream of video data associated with the source is included in the information signal for presentation to the addressee. In a preferred embodiment, the one or more graphical images associated with the source of the stored message are reproduced from a video stream within the stored message itself so as to present the addressee with dynamically selected images of the calling party, irrespective of the subscriber associated with the communications line from which the stored message was received. Advantageously, the captured video frames can be used to form a short video sequence for presentation to the addressee as part of the notification to the addressee of the stored message. Such a video sequence would preferably be associated with an audio track also captured from the stored message.

In accordance with another aspect of the invention, there is provided an apparatus for performing the aforementioned method. In one embodiment, the apparatus includes a generator for generating a graphical notification relating the stored message to at least one graphical image associated with a source of the stored message. In this embodiment, the apparatus includes a transmitter to transmit the graphical notification as an information signal to a communications device associated with the addressee.

Preferably, the apparatus comprises application software for performing the aforementioned method and which is operative to reside on a networked computer server. In one embodiment, a network computer is programmed to present to subscribing addressees their stored messages or pending graphical notifications associated with such stored messages.

In accordance with another aspect of the invention, there is provided a computer readable medium having codes for directing a network computer to (i) generate an information signal relating a stored message to at least one graphical image associated with a source of the stored message, and (ii) transmit the information signal to a communications device associated with an addressee of the stored message.

In accordance with yet another aspect of the invention, there is provided a system for performing the aforementioned method. In one embodiment the system includes a computer server operative to communicate with a database of information in which pending graphical notifications are stored and from which such notifications are retrieved by the computer server for presentation to a communications device of the addressee.

In a preferred embodiment, the system includes an integrated messaging server featuring both message recording services and graphical notification services. The messaging server is interconnected to at least one data store such as a database storing messaging information including user profiles for subscribers of the messaging system, recorded messages associated with subscribers and graphical message waiting notifications associated with the recorded messages of subscribers. Such messaging information may be integrated into a single database structure, segregated logically within the same server or segregated physically on separate computer servers.

User profiles may each provide one or more data structures for the management and provision of subscriber identification information and subscription services. In a centralized model, user profiles may include at least one data field relating a digital representation of at least one graphical image to the subscriber of the corresponding user profile. User profiles may also identify at least one recognized end-user communications device connected to the messaging network and capable of displaying graphical notifications associated with recorded messages available for review by the addressed subscriber.

When a message is recorded, the messaging server retrieves, directly or indirectly, information identifying the caller from the caller's user profile including graphical image information associated with the caller. A graphical message notification associated with the recorded message is generated by the messaging server and stored. The messaging server preferably includes at least one process for monitoring network messages from subscribers and other messaging servers.

In one embodiment, the messaging server retrieves and sends to a subscribing called party pending graphical notifications associated with stored messages from an appropriate database in response to a called party request for such information. In this embodiment, the end-user messaging software residing on an active subscriber communications terminal logs-on with the messaging server. Alternatively, the end-user messaging software may direct the user terminal to periodically poll the messaging server for pending notifications. In another embodiment, the messaging server polls recognized end-user communications terminals to determine if any are active to receive pending notifications. Communications may be established with active terminals associated with pending graphical notifications, and the latter notifications may then be sent to the appropriate active terminals for display.

The single messaging server embodiment advantageously provides a unified model, with both callers and called parties being subscribers of the same messaging server system capable of supporting fully compatible data structures for both caller and called party profiles, messaging data and notification data, and which reduces the need for intermediary gateways between caller and called party domains. In one variation of this embodiment, graphical notification services can be provided to a called party in respect of a recorded message from a remote caller located on another interconnected network or subnetwork.

In another embodiment, message recording services and graphical message waiting notification services may be segregated logically within the same server domain, or on separate computer servers interconnected locally or remotely over a network, thereby facilitating additional flexibility in the provision of the graphical notification services with existing and expanding networks. In addition, callers and called parties may be located on separate interconnected networks or subnetworks.

In accordance with another aspect of the invention, at least one intermediary web server may be provided which is interconnected to at least one called party messaging notification system. In this web-based embodiment, the messaging server may preferably send copies of pending graphical notifications to a web server for allocation to a web page associated with the called party. Once the pending graphical notification is delivered to the server, either the messaging server or the web server may notify a recognized active terminal associated with the called party of the pending notifications available at the web page or web server. Preferably, a called party's active terminal is prompted to retrieve the new web content, including the pending graphical notifications, for display on a network communications device such as a computer terminal. This may include transmitting a message from the web server for instructing the active terminal to launch a web browser, if available, to pull down the web page from a predefined web resource.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

In the accompanying drawings which illustrate embodiments of the invention,

FIG. 2 is a schematic representation of a data structure for user profiles accessed by messaging server software of the graphical message waiting notification system of FIG. 1;

FIG. 3 is a schematic representation of a data structure accessed by a messaging system for storing message profiles in accordance with the first embodiment of the present invention;

FIG. 4 is a schematic representation of another data structure accessed by a messaging system for providing graphical message notification in accordance with the first embodiment of the present invention;

FIG. 14 is an expanded view of a lookup table shown in FIG. 12;

FIGS. 15 and 16 illustrate HTTP messages transmitted by network resources in the network architectures shown in FIGS. 12 and 17.

Figure 1:
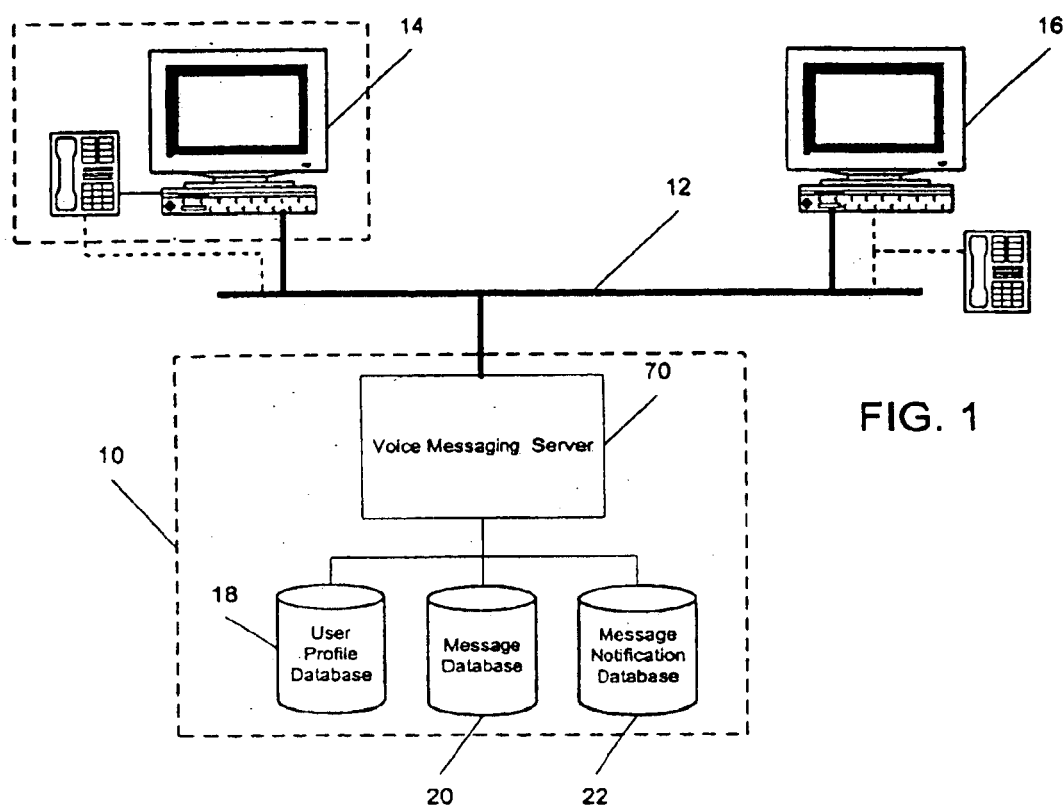
FIG. 1 is a schematic diagram of a graphical message waiting notification system within a networked environment according to a first embodiment of the invention.

It will be appreciated that for simplicity and clarity of illustration, elements illustrated in the accompanying drawings have not necessarily been drawn to scale. For example, the dimensions of some of the elements are exaggerated relative to other elements for clarity. Further, where considered appropriate, reference numerals and labels have been repeated among the drawings to indicate corresponding or analogous elements. Where also considered appropriate, descriptive tags defined in the specification have been repeated herein.

DETAILED DESCRIPTION

In the present invention there is provided a method, apparatus and system for providing an addressee of a stored message with a graphical notification associated with a source of the stored message. In general terms, a communications device of the addressee is presented with the graphical notification in the form of an information signal which relates the stored message to at least one graphical image associated with the source of the stored message.

Referring to FIG. 1, a graphical message waiting notification system according to a first embodiment of the invention is shown generally at 10 (also referred to herein, for ease of reference, as graphical notification system 10). For the purposes of the illustrative embodiment of FIG. 1, graphical notification system 10 includes an integrated messaging server system which provides voice messaging and graphical message notification services to subscribing users over network 12. However, a voice messaging system (or such other message acquisition services) may be separately associated with graphical notification system 10, provided graphical notification system 10 includes graphical message notification services relating messages stored in the voice messaging system to graphical notifications associated with the source(s) of such stored messages.

As noted above, system 10 is a "graphical" notification system. Although, in general, the term "graphical" may have several different meanings depending upon the context, persons skilled in the art will appreciate that in this specification, the terms "graphic", "graphical", "graphically", "graphical information", "graphical image" and the like are each used to refer to (as well as refer to the use of) computer graphics, and more particularly to one or more digital (or digitized) pictures, photos, icons, and/or video frames (with or without audio data), for display on a display device such as a monitor, a liquid crystal display (LCD), a digital screen or other electronic display device capable of displaying computer graphics. The terms "text" and "textual information", on the other hand, are used in this specification to refer to information selected from a binary-coded character set consisting of one or more letters, numbers and/or other typographic symbols. Examples of binary-coded character sets include ASCII, EBCDIC and BCD.

In the embodiment shown in FIG. 1, the graphical notification system 10 is connected to network 12 which interconnects with other communications devices such as source terminal device 14 and destination terminal device 16. Network 12 is, for purposes of illustration, an Ethernet-based local area network (LAN). Terminal devices 14 and 16 represent end-user communications devices which each either include, or are connected in communication with, a display device for the display of graphical information transported over network 12.

As an overview, graphical notification system 10 provides a mechanism for graphically notifying an addressee, via an end-user communication device having graphical display capabilities, of waiting messages stored within message database 20 (or accessible from a separate messaging system associated with system 10). When a communication is initiated by a source connected to network 12, such as source terminal device 14, the source attempts to make a connection with the addressee of the communication at destination device 16, either directly or indirectly via graphical notification system 10 or another network resource supporting such communication.

If the source cannot connect with the addressee within a predetermined period of time, the source is directed by graphical notification system 10 to the message recording services provided by system 10 if such services are available to the addressee. When a message from the source is recorded for the addressee, the graphical notification system 10 retrieves graphical information associated with the source so as to form a graphical notification identifying the source. To this end, graphical notification system 10 generates an information signal relating the stored message to at least one graphical image associated with the source of the stored message. The information signal is transmitted by graphical notification system 10 to the addressee's destination terminal device 16 via network 12 preferably in response to a request for pending notifications from the addressee received by system 10.

For the purposes of illustration, a communication from a source to an addressee is discussed below in the context of a telephone call from a calling party to a called party. It will be appreciated, however, that a communication in the context of the present invention may also include communications involving other media types such as a cell phone transmission, a pager message, a fax communication, an audio/video communication such as a video conference call over a data network, a voice call over IP, or an electronic mail (email) transmission (of arbitrary media, e.g. voice, graphics, video, text or combinations thereof). As well, the source associated with a stored message may be identified either by association with a subscriber of the caller line from which the stored message originated or an identifier associated with the source such as a user ID or a calling party ID.

It will also be appreciated by persons skilled in the art that network 12 can be any one of a variety of network infrastructures. For instance, network 12 may be another type of LAN, such as a Token-ring LAN or a carrier sense multiple access with carrier detection (CSMA/CD) LAN. Alternatively, or in addition, network 12 may include a wide area network (WAN) deployed using a network topology such as X.25, frame relay, asynchronous transfer mode (ATM) or synchronous optical network/synchronous digital hierarchy (SONET/SDH), or internetworked combinations thereof. Network 12 may alternatively be a circuit switched network, such as a public switched telephone network (PSTN) or a privately leased switched network (such as a T1, E1, T3 or E3 circuit switched network). In any combination of the above network topologies, network 12 may be a public network, a private network or intranet, or part of the Internet.

Furthermore, while graphical notification system 10 is discussed in the context of a voice messaging system, graphical notification system 10 may in other embodiments include, in the alternative or in addition, other messaging services such as audio/video messaging, fax messaging or email messaging. Similarly, terminal devices 14 and 16 may include one or several different types of (end-user) communications devices, such as network computer terminals, networked personal computers, network display telephones, telephones optionally connected to associated personal computers (PCs), public display telephones, or wireless communications devices such as mobile telephones connected over a wireless network, provided such communications devices include, or are connected to, a display device so that graphical notification information may be received by the terminal device and graphically displayed on the display device, preferably along with other information such as the calling number, the date and time of the associated message and the caller name.

Referring to FIGS. 1 and 2, subscribing users of graphical notification system 10 are each allocated a user profile 30 which is stored within the user profile database 18. Each user profile 30 provides one or more data structures for the management and provision of user identification information and subscription services. User profile 30 includes a graphical data field 44 related to a digital representation of at least one graphical image associated with the user corresponding to the user profile. Graphical data field 44 may include either a reference to one or more graphical images, or digital representations of such graphical images. As will be seen below, when a subscribing caller records a message for a subscribing called party, the caller's graphical image data is accessed by graphical notification system 10 and appended to graphical notification message 60 which is stored in memory allocated to the called party within a message notification database 22 for subsequent retrieval and presentation to the called party.

User profile 30 may include a variety of other fields. For instance, for a subscriber of a voice messaging system, user profile 30 preferably is structured to include the subscriber's phone number, name and address information, and recorded greetings in fields 32, 34, and 36, respectively. Preferably, user profiles are used for calling subscribers and called subscribers. Furthermore, user profile 30 may include a graphical identification field 42 to support the provision of different classes of graphical information. For instance, graphical images may be digital representations categorized as single images, digital video frames, one or more graphical icons or digital audio/video data. Supporting a variety of classes of graphical information has the advantage of extending the functionality of graphical notification system 10 to provide a more flexible range of services to subscribers who may have different classes of end-user display devices.

AB another variation, user profile 30 may include a field 38 identifying the type of end-user communications device registered with the voice messaging system. This latter arrangement provides graphical notification system 10 with the capacity to readily determine which services a subscribing user's communication device is capable of handling. This can be of advantage when system 10 supports a variety of different classes of graphical information since not all end-user communications devices may support all types of graphical information. Recording a subscriber's type of communication device within the user profile facilitates the advanced determination by system 10 of what graphical data of a caller is suitable to present to the called party's display device.

User profile 30 may also include address information for a variety of subscriber devices as exemplified by field 40, so as to provide graphical notification system 20 further flexibility in notifying an addressee via one or more devices identified within field 40. For the illustrative embodiment shown in FIGS. 1 and 2, terminals 14 and 16 include a telephone set and a personal computer which are co-located at a user's workstation and are registered in user profile database 18, using fields 38 and 40, as belonging to associated subscribers.

In the embodiment illustrated in FIGS. 1 and 2, user profile 30 is also shown having an index 46 to the user's recorded/waiting messages received by graphical notification system 10. It will nevertheless be appreciated that a user's recorded messages may be referenced in one of many different ways. By way of example, the recorded messages may be stored directly as part of user profile 30. Alternatively, the recorded messages may be cross-referenced in a separate table cross-referencing users with such messages, rather than having an index within user profile 30.

Referring to FIGS. 1 and 3, a received message is allocated by graphical notification system 10 to a message profile defined by a data structure 50. Message profiles for a called party are stored within message database 20 for subsequent retrieval and presentation upon the called party requesting the corresponding recorded message from graphical notification system 10. As illustrated by message data structure 50, each message profile includes a field 58 for the caller's recorded message as well as message identification fields 52 for storing caller line ID data such as the caller's telephone number and name. Other fields 54 and 56 may also be provided for recording information such as the time and date the associated message was recorded, the message length or duration, the reviewed status of the message, the priority of the message, and addressing information identifying, for example, a list of other recipients of the recorded message.

When a message is received from a caller and recorded, graphical notification system 10 retrieves information identifying the caller from the caller's user profile within user profile database 18 and a message profile is generated. The retrieved identification information is preferably appended by graphical notification system 10 to the message profile associated with the recorded call and the message profile is stored by system 10 in the message database 20. Graphical notification system 10 furthermore generates an information signal in the form of a message notification packet structured according to a data structure such as data structure 60. The message notification packet encapsulates caller information including the caller's phone number and graphical data related to a digital representation of at least one graphical image available from the caller's user profile within user profile database 18. Thus, for the first embodiment shown in FIG. 1, the information signal generated relates the stored message with at least one graphical image associated with the source of the stored message. The graphical data stored within the message notification packet may be an actual digital representation of an image from the caller's user profile, a reference to the digital representation such as a pointer reference, or a network address identifying a specific location on network 12 where the actual digital representation may be retrieved for display on the called party's communications terminal when the called party reviews pending message notifications.

Figure 5:
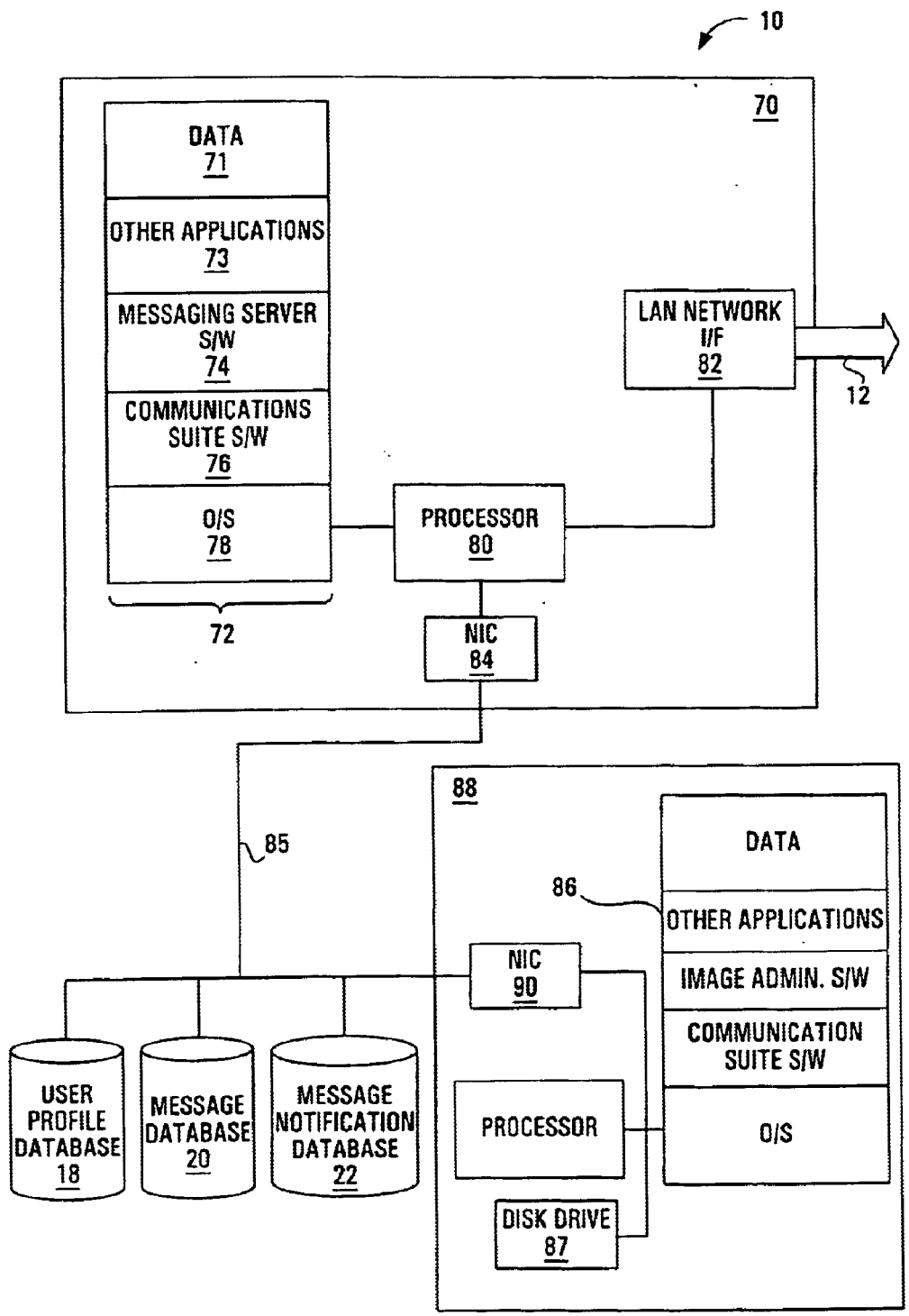
FIG. 5 is a block diagram of the graphical message waiting notification system shown in FIG. 1.

Referring to FIG. 5, there is shown a more detailed representation of graphical notification system 10 from the first embodiment in FIG. 1. As shown in FIG. 5, graphical notification system 10 includes computer server 70, memory 72, messaging server software 74, user profile database 18, message database 20 and message notification database 22. Computer server 70 is a networked computer which is directly or indirectly connected to network 12 (see FIG. 1) and is a server suitable for hosting messaging services for a plurality of subscribers. By way of example, computer server 70 may be a Reduced Instruction Set Computing (RISC) device such as a Sun Microsystems UltraSparc(TM) Station or an IBM RS/6000(TM), or a personal computer suitable for hosting messaging services such as a Compaq Proliant (TM) or an IBM NetFinity(TM) server. Preferably, computer server 70 is scalable to the needs of graphical notification system 10 as the number of subscribers increases.

As illustrated in FIG. 5, memory 72 provides a memory store for software and data residing on computer server 70 such as messaging server software 74, communications suite 76 and operating system 78. Memory 72 also stores data 71 for remote or local retrieval and other applications 73. Operating system 78 is preferably a multitasking operating system such as Unix, Linux, Microsoft Windows NT(TM), Sun Solaris(TM) or IBM AIX(TM). Communications suite 76 includes software providing transport and routing communication protocols as well as network interface software for enabling communications between users over network 12 (FIG. 1). Preferably, communications suite 76 includes the well known and ubiquitous TCP/IP suite of services, although other communications protocols, such as those adhering to the Open Systems Interconnection (OSI) reference model in the International Standards Organization (ISO) standard 7498, or layered arrangements which make use of TCP or IP with other available protocols, may be used in the alternative, so long as such communications suites are sufficient to provide a networked environment for use of the graphical message waiting notification system contemplated herein.

Figure 6:
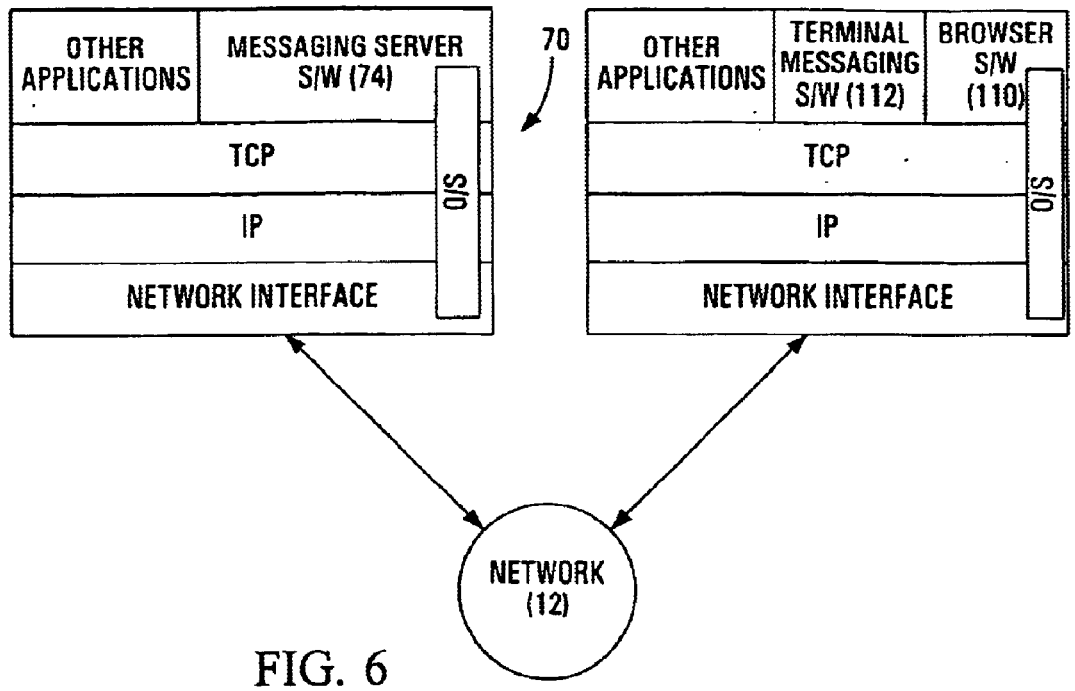
FIG. 6 is a block diagram illustrating layering of communication functions of the graphical message waiting notification system shown in FIG. 1.

Referring to FIG. 6, there is shown an example of the layering of communications functions in the present invention using the TCP/IP suite. As is known in the art, the Internet Protocol (IP) is a widely used connectionless routing protocol, similar to the connectionless network protocol (CNLP) specified in ISO 8473, and serves as the foundation for routing over a variety of networks, including the Internet. Connection-oriented services can be, and often are, provided over the IP protocol using a higher layer transport protocol such as the Transmission Control Protocol (TCP). TCP is a connection-oriented, packet-switching protocol used for communications between processes in host computers and connected users. TCP maintains status and state information about each user data stream flowing into and out of the associated TCP software module. The TCP protocol also provides end-to-end data transfer across one network or multiple networks to a higher layer protocol or application at a destination resource. In the TCP/IP model in FIG. 6, communications at the network layer between computer server 70 and network 12 are handled by the network interface which in the illustrative embodiment in FIG. 1 implements the IEEE 802.3 ethernet standard.

Referring to FIGS. 5 and 6, messaging server software 74 is an application layer entity which preferably resides on computer server 70 in memory 72 and executes on central processor 80 of computer server 70. Messaging server software 74 comprises computer readable codes which program computer server 70 to provide voice messaging services and graphical message waiting notification services. It will be appreciated, however, that voice messaging services and graphical message waiting notification services may be provided in sets of codes within two or more interoperable software applications running on the same computer server 70 or several connected computer servers.

Messaging server software 74 directs computer server 70 to communicate with user profile database 18, message database 20 and message notification database 22 optionally via network interface 84 connected to private LAN 85. Databases 18, 20 and 22 may reside in one or more memory stores, preferably including at least one permanent storage device such as a hard disk drive, located on computer server 70 or on separate server computers networked in communication with computer server 70. The messaging server software 74 uses the user profile database 18, message database 20 and the message notification database 22 which serve as data stores for the management and provision of message and user information within graphical notification system 10.

Also included in the graphical notification system 10 there is provided image administration software application 86 which comprises codes which may reside on and be processed by a separate computer 88 connected via a network interface 90 to the computer server 70 so as to reduce the amount of administrative load on computer server 70. The image administration software 86 provides services for the receipt and storage of digital representations of one or more graphical images associated with subscribers of graphical notification system 10. Preferably, image administration software 86 includes commercially available software such as Adobe Photoshop(TM) which may be used to direct computer 88 to handle the resizing of graphical images to preset sizes suitable for end-user display devices. Computer 88 is preferably capable of handling the reception of such images locally via a disk drive 87 or other local input device such as a scanner connected to a Universal Serial Bus, or from subscribers on a secured basis over network 12 (FIG. 1) using, for instance, remote access software such as PC Anywhere(TM). Graphical images received by computer 88 may be stored in user profile database 18 or another connected database, thereby facilitating the ability of system administrators and subscribers (where suitable) to add to, delete from or otherwise modify graphical images within their user profiles.

Figure 7:
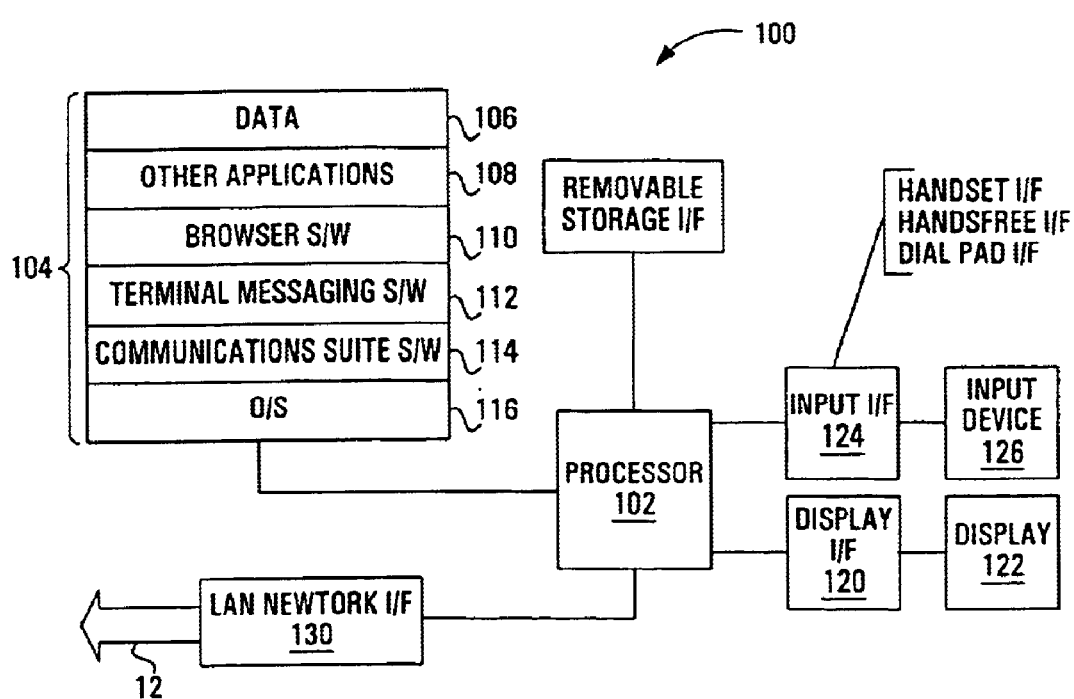
FIG. 7 is a block diagram illustrating a called party's end-user communications device of the graphical message waiting notification system shown in FIG. 1.

Referring to FIG. 7, there is shown a schematic diagram of end-user communication device 100, exemplified earlier by terminal devices 14 and 16 (see FIG. 1). Communication device 100 includes central processor unit 102 connected to: memory 104, display 122 (via display interface 120), user input device 126 (via user input interface 124), and network interface 130. Central processor 102 performs the operations necessary to connect communications device 100 to a network via network interface 130 and is programmed by terminal messaging software 112 to receive and display graphical message notifications in the form of incoming information signals associated with stored messages on display 122. By way of example, processor 102 can be selected from the Intel x86 chipset, Intel Pentium(TM) series, Motorola PowerPC(TM) or G3 series, or another suitable processor. Data, such as graphical message notifications, which are to be displayed by communications device 100 are transmitted by processor 102 to display device 122 which may be any type of display supporting the display of graphical images. Memory 104 is preferably comprised of volatile memory such as Random Access Memory (RAM), and non-volatile memory such as a hard disk drive or Read only Memory (ROM).

As illustrated in FIG. 7, memory 104 may contain a variety of software programs, including an operating system 116, communications suite 114, and terminal messaging software 112. The operating system 116 may be selected from a variety of operating systems and preferably provides a graphical user interface (GUI) such as in Microsoft Windows 98(TM), Windows CE(TM) or Macintosh Operating System 8(TM). It will be appreciated, however, that operating system 116 is by no means limited to more robust operating systems. In fact, for more specifically tasked end-user communications devices, such as computerized display phones, a more simplified operating system such as pSOS, available from Integrated Systems Inc., is preferred. Communications suite 114 may include TCP/IP, Point-to-Point Protocol (PPP), or SLIP, as well as Ethernet or Token Ring software protocols for network communication via network interface 130. It will be appreciated, however, that communications device 100 may alternatively interface with a network via a wireless LAN or other wireless data network equipment, or via a cable or Asymmetric Digital Subscriber Line (ADSL) modem or the like. For more fully featured end-user communications devices, such as with personal computers, lap-top computers, or palm-top computers, communications device 100 preferably includes browser software 110, such as Netscape Navigator(TM), Microsoft Internet Explorer(TM), Mosaic(TM) or other commercially available browsers for connecting device 100 to the World Wide Web (WWW) and other IP based communications.

Figure 8:
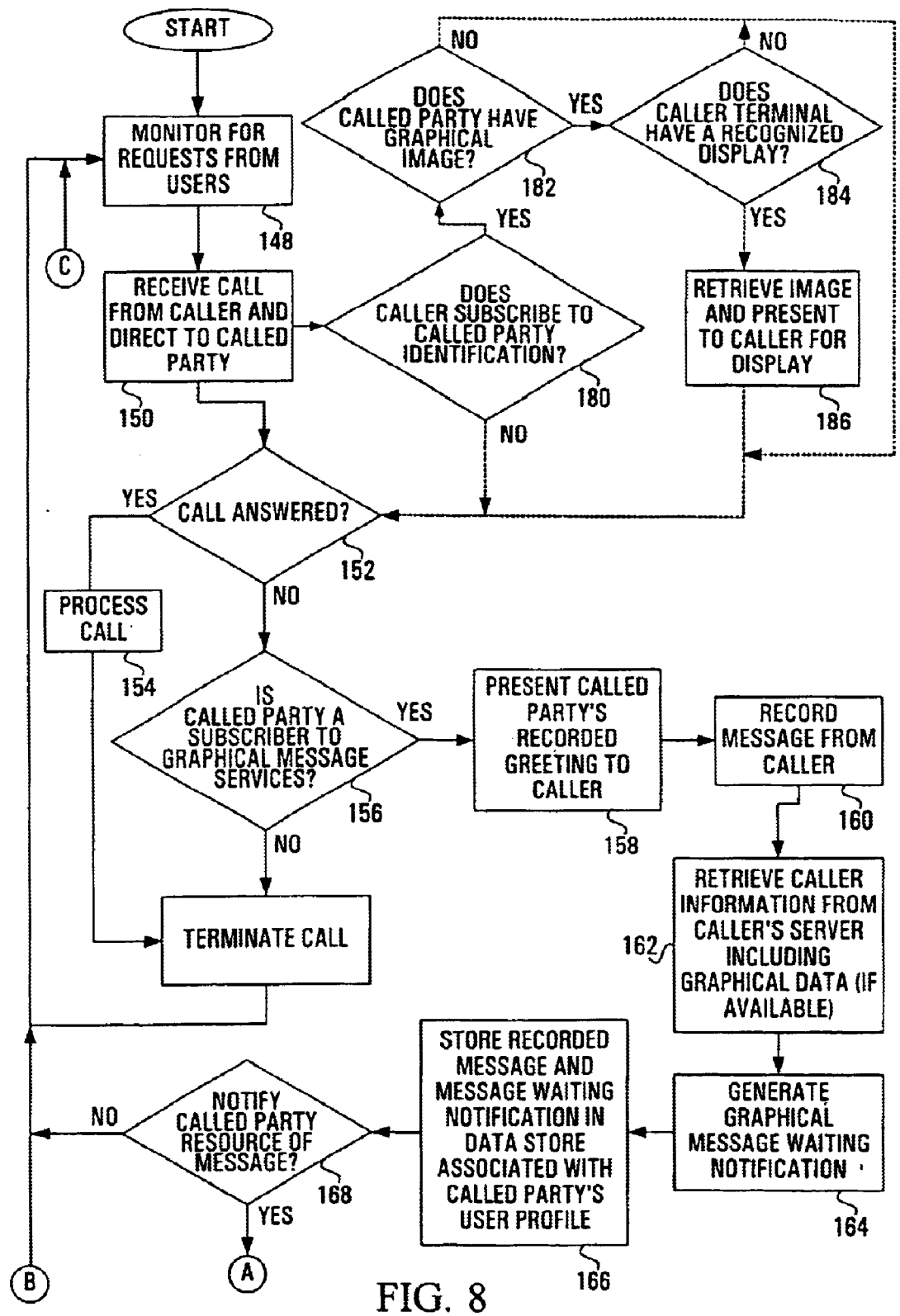
FIG. 8 is a flow diagram illustrating the operation of a graphical message waiting notification system including the operation of the system of the first embodiment shown in FIG. 1.

Referring to FIG. 8, there is shown a flow diagram illustrating the notification services available with graphical notification system 10 for the embodiment in FIG. 1. For ease of reference in the following discussion, reference is made to FIGS. 1 to 8. In operation, a call is made by a caller from source terminal 14, to a subscribing called party at destination terminal 16, over network 12 via graphical notification system 10. Preferably, messaging server software 74 is executed by processor 80 and programs computer 70 to monitor for subscriber requests over a network interface to network 12 at step 148. When a call from the caller is received by computer server 70, the call is directed by messaging server software 74 at step 150 to the called party's destination terminal 16 using the called party's address information stored in user profile database 18. If the call is answered at step 152 communication between the caller and called party proceeds at step 154 in the usual way available over the network until it is terminated by one of the parties. If, on the other hand, the called party does not answer the caller's call within a predetermined period of time, messaging server software 74 directs computer server 70 to query user profile database 18 at step 156 to determine if the called party is a subscriber of graphical messaging services. If computer server 70 determines that the called party is a subscriber of the messaging services of system 10, messaging server software 74 directs computer server 70 to retrieve the called party's recorded greeting from the corresponding user profile and to transmit the greeting to the caller at step 158, prompting the caller for a message. The caller's message is then recorded by computer server 70 at the direction of messaging server software 74 at step 160 and the caller's identification information including graphical data (if available and if the called party subscribes to the graphical service) is retrieved at step 162 from the caller's user profile in user profile database 18.

At step 164 messaging server software 74 directs computer server 70 to generate a graphical message waiting notification represented by an information signal which is associated with the recorded message from the caller and which includes a digital representation of at least one graphical image associated with the subscribing caller. In this way, messaging server software 74 directs computer server 70 to generate an information signal relating the stored message to the at least one graphical image. As a variation, if messaging server software 74 supports video or audio/video messaging, one or more frames of the recorded video or audio/video message may be reproduced within the graphical message waiting notification at the direction of messaging server software 74. Inserting into the notification live frames of video of the calling party offers the advantage of making available to the called party graphical images associated with the actual calling party, irrespective of the subscribing line, subscribing connection or subscriber ID used by the calling party to send the recorded message.

Computer server 70 stores the caller's recorded message with appended caller and call information (which in combination form the message profile) and the graphical message waiting notification at step 166 in message database 20 and graphical message notification database 22, respectively, and modifies the called party's user profile in user profile database 18 to record a reference to the newly recorded message and notification. Preferably, subscribers connect to computer server 70 via network 12 to retrieve pending notifications. Alternatively, pending notifications may be pushed to subscribers. For instance, if, at the direction of messaging server software 74, computer server 70 determines at step 168 that based on the called party's user profile a networked resource of the called party should be notified of the recorded message or graphical notification, computer server 70 proceeds to additional processing at step 210 (in FIG. 11) and otherwise preferably returns to monitoring for subscriber requests over network 12 at 148.

Figure 9:
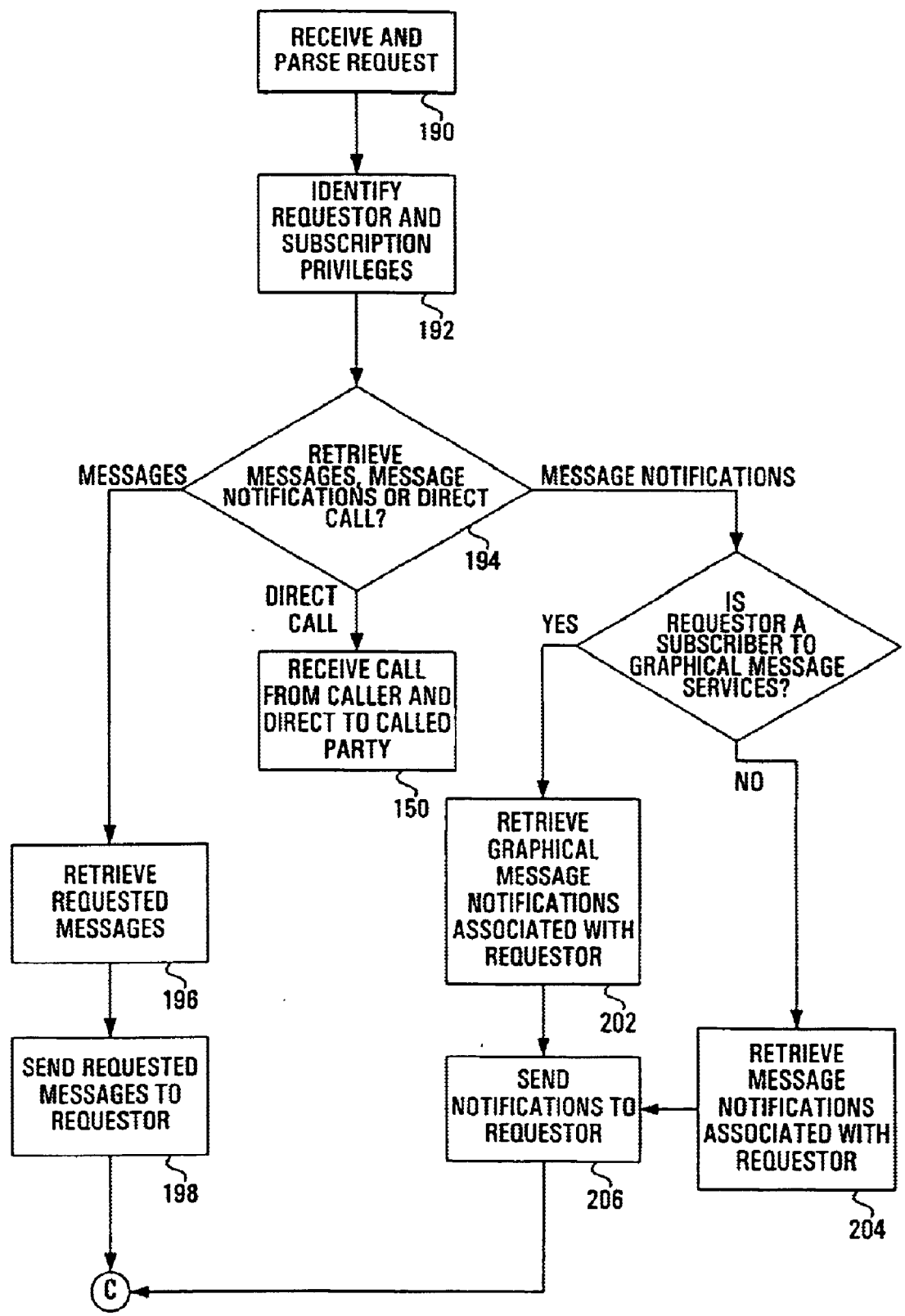
FIG. 9 is a flow diagram illustrating the monitoring operations carried out by a computer server at the direction of messaging server software in accordance with the first embodiment of the invention in FIG. 1.

The process of monitoring for user requests at step 148 of FIG. 8 by messaging server software 74 (FIG. 5) is decomposed into several operations in FIG. 9. For ease of reference, the decomposition of the monitoring process is described below with reference to FIGS. 1 to 9. With TCP/IP communications, a client/server model is preferably implemented wherein a network-side server process running on computer server 70 with messaging server software 74 monitors a first port for incoming requests and data from subscribers. A network-side client process also running on computer server 70 with messaging server software 74 is used to initiate transmissions to networked subscribers over a second port. At each networked subscriber terminal, a user-side server process running on such terminal with the user-side terminal messaging software 112 monitors the second port for transmissions directed from the network-side client process via computer server 70. A user-side client process also running with the terminal messaging software 112 initiates transmissions and subscriber requests to the messaging server software 74 over the first port being monitored by the networked-side server process.

When computer server 70 receives a request at step 190 (while monitoring at step 148) over network 12, messaging server software 74 directs computer 70 to parse the request. At step 192 messaging server software 74 identifies the requester (including the requestor's terminal address) and the subscription privileges of the requestor. This latter operation includes authenticating the requestor as a recognized subscriber of graphical notification system 10 and instructing computer server 70 to query the user profile database 18 for information on the requestor's subscription services. For identified subscribers, messaging server software 74 determines at step 194 whether the request includes a request to retrieve one or more of the subscriber's recorded messages, a request to retrieve message notifications for the subscriber, or a request to connect a call. Requests to connect a call are handled by messaging server software 74 at step 150 in the manner described above (in FIG. 8). Requests for the retrieval of recorded messages are processed at the direction of messaging server software 74 at step 196 wherein computer server 70 queries the message database 20 for the appropriate messages. Retrieved messages are sent by computer server 70 at step 198 using the TCP/IP protocol to the terminal address of the subscribing requestor. For requests identified at step 194 as requests for message notifications, computer server 70 determines at the direction of messaging server software 74 whether or not the subscriber/requestor has subscribed to the graphical message services of graphical notification system 10 at step 200. If the requester is a subscriber of the graphical message services, messaging server software 74 initiates at step 202 retrieval of pending graphical message notifications associated with the requester from graphical notification database 22. Retrieved graphical notifications are transmitted by computer server 70, at the direction of messaging server software 74, in the form of information signals to the terminal address of the subscribing requestor at step 206. For a subscriber that is a subscriber of notification services but not the graphical notification service, pending non-graphical message notifications associated with the requestor are retrieved at step 204 and sent to the subscriber at step 206.

Referring to FIGS. 1 to 8, as an additional enhancement to graphical message waiting notification system 10, messaging server software 74 may optionally direct computer server 70 to query at step 180 (in FIG. 8) the caller's user profile in user profile database 18 to determine if the caller subscribes to called party identification services. If the caller is a subscriber to called party identification services, then computer server 70 queries at step 182 the called party's user profile in user profile database 18 to determine if the called party has a graphical image associated with the called party. If a graphical image for the called party is found, and if computer server 70 can determine that the caller's terminal is capable of receiving such graphical information based on the caller's user profile (step 184), messaging server software 74 can direct computer server 70 to retrieve and transmit the graphical information to the caller's terminal for display (step 186) as the call is processed or a message recorded. In addition to providing the calling party with graphical information, textual information about the called party can be retrieved by computer server 70 at step 186 and communicated to the calling party's terminal device 14. These enhancements offer an automated mechanism for providing a calling party with information associated with the called party which may not have been available to the calling party before the call was initiated. For example, textual information presented to the calling party may include the called party's e-mail address, postal address, title, and alternative addressable communications numbers such as telephone numbers, fax numbers or cell phone numbers.

Preferably, in the latter case, textual information and graphical information associated with the called party are presented to the calling party at step 186 in a business card-like format for display within a viewing window on terminal 14. Such graphical and textual information associated with the called party may be saved locally on terminal 14 in a contact list database or as separates files in a directory for subsequent easy retrieval and use by the calling party. For instance, such locally saved graphical and textual information may be subsequently retrieved on terminal 14 for use in an autodialer coded to program terminal 14 to call the party associated with the retrieved information. Similarly, calling party information, including graphical information and textual information, associated with a caller line or a subscriber ID may be communicated to the called party in a pre-defined business card-like format at the time of a call. If the call is not answered, such calling party subscriber information may be passed to the called party's network messaging server (such as computer server 70) for storage in association with a stored message from the calling party and for generation by computer server 70 of a graphical message waiting notification associated with the stored message.

In the event the call is not answered but the destination terminal 16 is nevertheless active, messaging server software 74 may direct computer server 70 to transmit an alert to TCP/IP server software running on the called party's terminal 16 so as to notify terminal 16 that the call has been transferred to computer server 70 for invocation of the recording services at step 156 (in FIG. 8). In response to terminal 16 receiving the alert, terminal messaging software 112 (FIG. 7) preferably directs terminal 16 to display a graphical button or other interactive graphical mechanism in a view screen which, when selected, initiates transmission by terminal 16 of a message to computer server 70 instructing computer server 70 to interrupt the recording of the calling party's message and to transfer the calling party's call to the called party's terminal 16 or telephone or the like so that the call may proceed. This feature provides a called party may with the ability to interactively establish a call or communication with the calling party even after the calling party has been redirected to the recording services of computer server 70.

Figure 10:
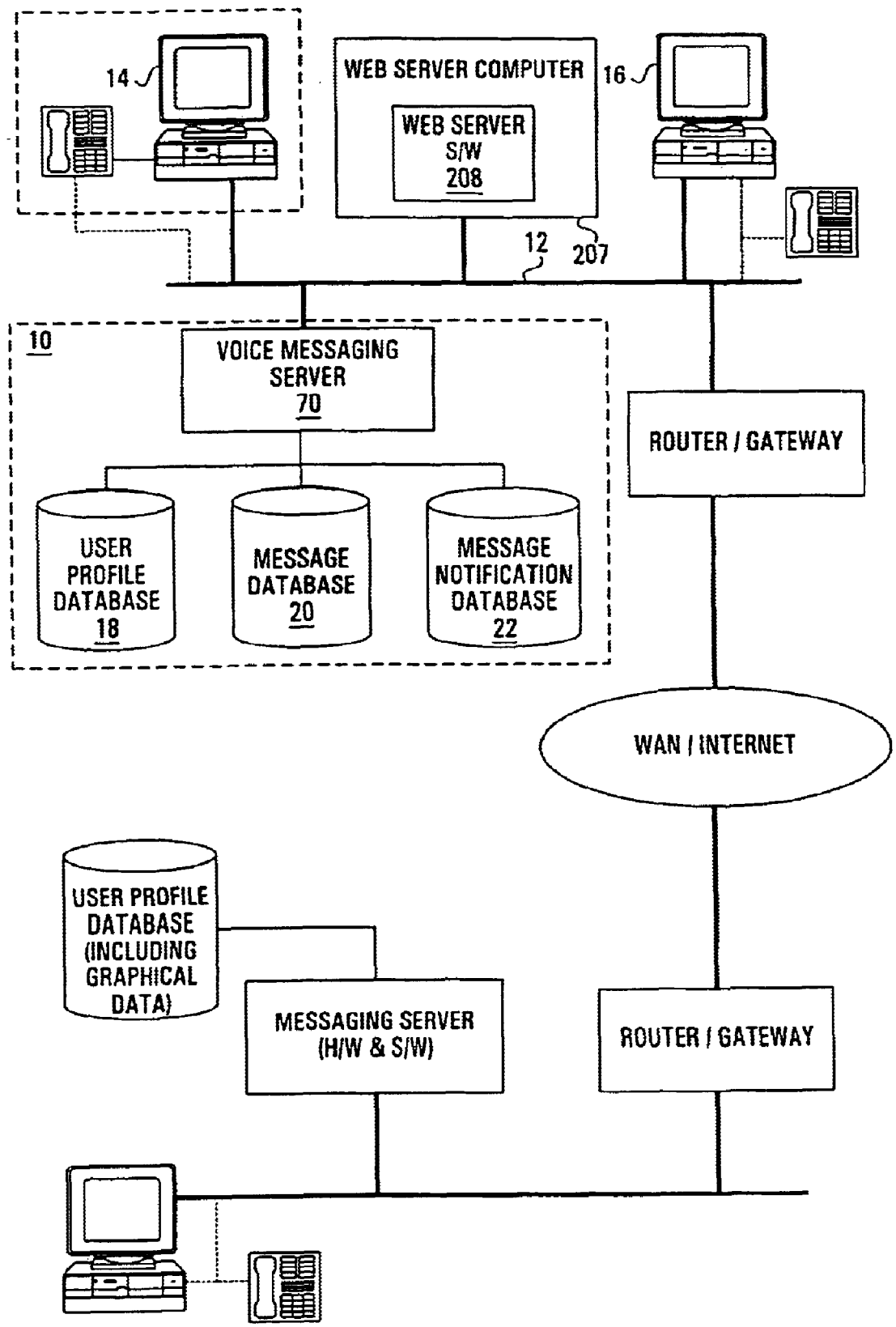
FIG. 10 is a block diagram of a graphical message waiting notification system including a web notification server in accordance with a second embodiment of the invention.

In a variation of the architecture of the embodiment of the invention shown in FIG. 1, web-based graphical notification services may be provided using a web server such as web server software 208 which, as illustrated in FIG. 10, may reside on a networked computer server such as web server computer 207 which is connected to network 12 and which is interoperable with computer server 70 and network subscriber terminals via a common communications protocol such as the TCP/IP suite. Preferably, web server computer 207 is configured to support protocols such as the well known Hypertext Transport Protocol (HTTP), the File Transfer Protocol (FTP) and gopher. Web server computer 207 includes a central processor connected to memory having at least one permanent storage device. Web server software 208 resides within the memory of web server computer 207 and directs web server computer 207 to receive, store, retrieve and transmit web pages and other files, and to receive and process user and host requests over network 12. Commercially available web server software include Apache's web server software and Microsoft Internet Information Server. Advantageously, web server software 208 can be configured to serve as a secure web-based message notification server operative to store web pages associated with subscribers of graphical notification system 10. In such an embodiment, the stored subscriber-related web pages may be used by computer server 70 under the direction of messaging server software 74 as notification web pages to record graphical notifications for subsequent retrieval and viewing by associated subscribers. Graphical notifications associated with stored messages may thus be embedded into a subscriber's notification web page stored on web server computer 207. Advantageously, a notification web page may be retrieved from within network 12 or externally, for instance via the Internet. Such embedded graphical notifications can include a full-size or reduced-size (eg. a thumb-nail image) graphical image associated with the caller and caller information such as the caller's name and network address or phone number.

In one variation, hyperlinks may be associated with each embedded graphical notification so that when such graphical notification is selected, an associated hyperlink initiates an HTTP message or other type of message (eg. FTP or gopher) from the subscriber's terminal directed to computer server 70 and requesting the delivery of the recorded message associated with the embedded graphical notification. Alternatively, recorded messages may reside on the web server computer 207 and a subscriber selected hyperlink message may send an HTTP message to the web server computer 207 requesting transmission of the selected recorded message to the IP address of the subscriber's terminal.

Figure 11:
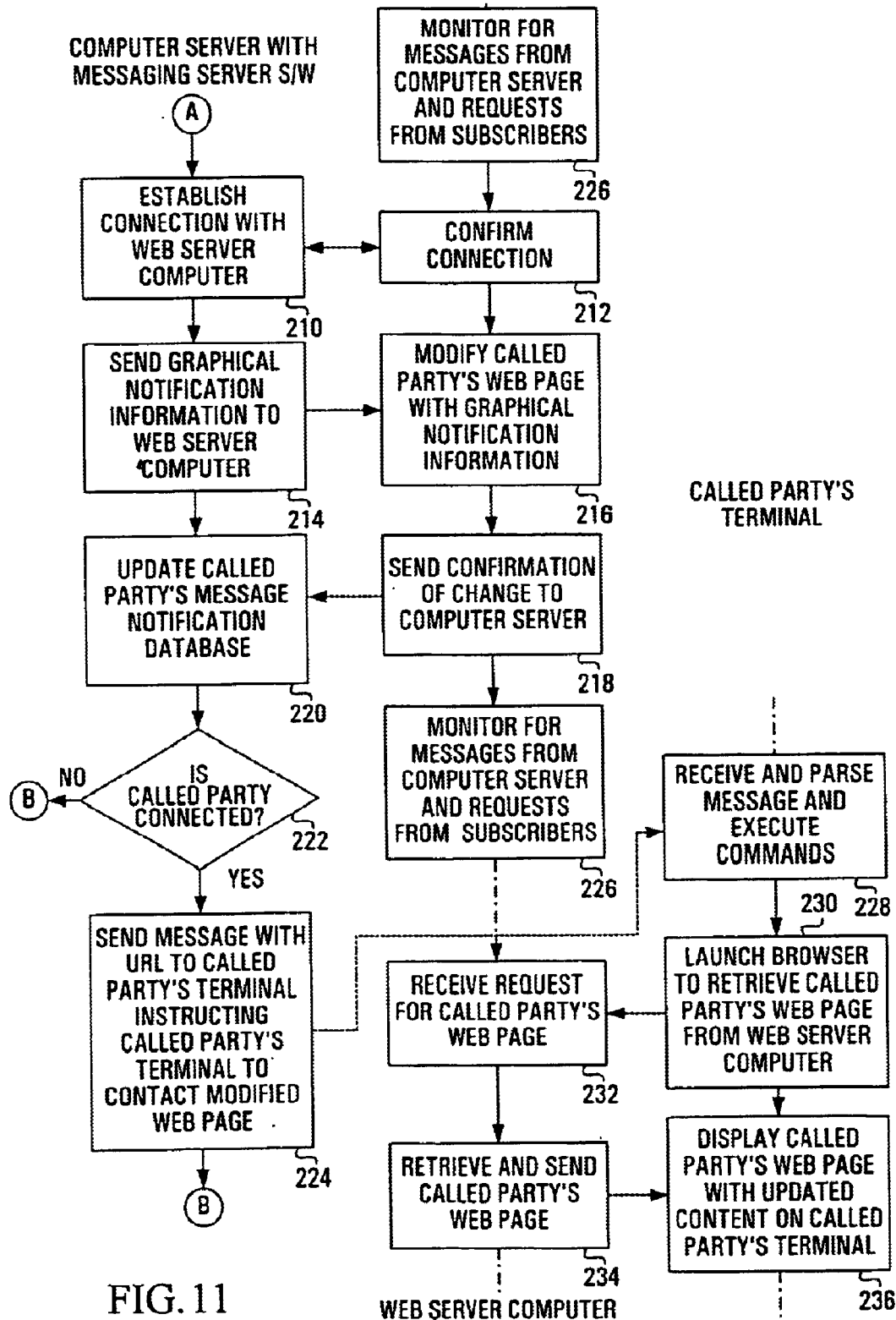
FIG. 11 is a flow diagram illustrating the operation of various graphical message waiting notification services in accordance with the second embodiment of the invention in FIG. 10.

Referring to FIG. 11, there is shown in operation an illustrative embodiment of the web notification architecture described above with respect to FIG. 10. The operations of three network entities are shown in FIG. 11: (a) operations by computer server 70 with the direction of messaging server software 74, (b) operations carried out by web server computer 207, and (c) operations carried out locally at a called party's terminal communications device. Referring to FIGS. 8, 10 and 11, it will be recalled that when recording a message from a caller, messaging server software 74 may optionally determine at step 168 if the called party user profile stored in user profile database 18 identifies any called party resource registered to receive notification of the recorded message or pending notification. In the web-based addition above, the called party's user profile may include a field identifying web server computer 207 or a similar web-based resource which may be registered to receive notification information (including graphical information associated with the caller if available). In the case where the user profile indicates that web server computer 207 is a registered resource, messaging server software 74 directs computer server 70 to retrieve from the called party's user profile in user profile database 18 the location of a preselected web page on web server computer 207 associated with the called party and optionally the IP address of web server computer 207. Alternatively, the IP address of web server computer 207 can be a single, standardized location pre-programmed into computer server 70.

Once the requisite web page information is retrieved from the called party user profile, messaging server software 74 directs computer server 70 to establish a connection with web server computer 207 at step 210. If computer server 70 is programmed for telephony messaging services, such as a voice messaging computer operating at a central office or PBX equipment, then computer server 70 communicates with a telephone switch via a telephony programming interface protocol such as Microsoft's Telephony API (TAPI) so as to control telephone sessions. As an alternative telephony interface, one may use Novell and AT&T's Telephony Services API (TSAPI) which is designed to enable a telephone PBX with a Netware(TM) server to provide interoperability between personal computers and telephone equipment. In such telephony environments, the telephone switch may be a PBX or Central Office for network configurations that use a telephone network to carry voice signals, or a gatekeeper or the like for configurations that use a Voice over IP protocol (such as specified in the H.323 Specification) to carry voice signals over data networks.

In operation, web server computer 207 may monitor its network interface with network 12 periodically at step 226 for messages from computer 70 and from subscriber terminals. When a network connection request from computer server 70 is received by web server computer 207, the network request is verified and a confirmation may be transmitted back to computer server 70 (step 212). Messaging server software 74 directs computer server 70 to send the new graphical notification information at step 214 encapsulated in a network message to web server computer 207 so as to add the graphical notification information to a web page associated with the called party (216). By way of example, computer server 70 may send an HTTP message containing the IP address associated with the web server computer 207, the name of a server-side common gateway interface (CGI) script residing on web server computer 207 and data and command parameters for configuring the server-side CGI script.

At step 216, web server software 208 directs web computer server 207 to parse received network messages from computer server 70 and proceeds to modify the called party's web page accordingly to include the new notification information. In the above HTTP messaging example, the server-side CGI script is executed by web server computer 207 so as to create or modify an HTML document and to populate the HTML document with the new notification information. Preferably, the server-side CGI script initiates a confirmation of the successful update which may then be sent by web server computer 207 to computer server 70 at step 218. When computer server 70 receives the confirmation, it proceeds to update at step 220 the called party's message notification records on database 22 to reflect the successful web-site update.

Optionally, other called party related records may be modified at step 220 such as the called party's user profile located in database 18. Following modification of the called party's web page with the graphical notification, computer server 70 may poll at step 222 one or more registered called party end-user terminal devices to determine if the called party is connected. This latter operation offers the advantage of both pushing the updated web page graphical content to the called party's web site server and pushing another preferably brief notification directly to a networked end-user terminal to initiate retrieval by the active terminal of the modified web page from web server computer 207. For instance, at step 224, computer server 70 may send to the active end-user terminal a signal representing an ASCII string providing a Uniform Resource Locator (URL) to the called party's updated web page on web server computer 207. This string may be encapsulated within an HTTP message instructing the called party's active terminal to access the web server computer 207 and the string itself may contain, as an access scheme to the called party's web page, another HTTP message making up part of the aforementioned URL. Of course, other access schemes may be implemented, including, for example, FTP and gopher.

In the event an active end-user terminal associated with a called party receives a TCP/IP message from computer server 70, the message is parsed by the terminal message software residing on the active terminal at step 228 and the parsed instructions are executed. Preferably, the instructions parsed from the message include an instruction for the active terminal to launch a web browser application residing on the active terminal. The web browser could be launched at step 230 with the received URL identifying the access scheme and location of the updated web page for the called party. In this way, the web browser will automatically initiate a connection with web server computer 207 and retrieve the called party's notification web page. As a variation, only an indication that the called party's message waiting notification web page has been updated need be sent to the active terminal, wherein the appropriate URL is then sent by the active terminal's browser to the web server to fetch the updated web page. This latter variation provides a simplified solution, although it will be recognized that such a solution would require the called party's active terminal to access a predetermined web page located at the web server's IP address and known to the active terminal. Providing the entire URL enables the active terminal to dynamically locate any web page sent to the terminal, rather than only a web page associated with the web server IP address and known to the called party's active terminal in advance.

When the web server computer 207 receives the request for the called party's updated web page at step 232, web server software 208 directs web server computer 207 to check to see if the requested web page exists. If the requested web page exists, web server computer 207 retrieves the requested web page and transmits the web page to the requesting terminal of the called party at step 234 wherein upon receipt of the web page at step 236, the web browser displays the requested web page on the active terminal's display device. As previously indicated, once the updated web page is displayed on the active terminal, the called party may review the web page for new or saved graphical notifications, and may easily select a hyperlink object associated with one or more graphical notifications on the web page to initiate retrieval of the full recorded message associated with the graphical notification(s). Such a retrieval request for a stored message would preferably be directed to computer server 70 either via the web server computer 207 or from the active terminal's browser directly by encoding a hyperlink within the associated web page appropriately.

While the above web-based embodiment provides a preferred embodiment, it will be appreciated that other enhancements and variations to a web-based architecture are also contemplated within the present invention. For instance, rather than pushing brief notifications from computer server 70 to an active terminal of the called party at step 224, such a brief notification may be sent from the web server computer 207 instead. Alternatively, a called party's active terminal may have its terminal messaging software 112 programmed to monitor for updates directly, or via a terminal browser, one or more pre-selected web pages associated with or owned by the called party. In this latter variation, updates to a called party's web page would be identified by the monitoring active terminal which could then initiate the retrieval of the updated web page(s) from the web server computer 207 directly or via a browser.

In another variation, a simplified web-based solution may be implemented wherein an intermediary web server computer is used as a file server for storing subscriber information graphically identifying a subscriber and including contact information in respect of the subscriber. In this simplified case, a system administrator may be responsible for setting up web pages on web server computer 207 for each user. Such user web pages may be set up using a business card-like format with an HTML template which may be accomplished with commercially available software such as Microsoft's FrontPage(TM). Preferably, such user web pages would specify unique graphics information and other user information indicative of associated subscribers. In this way, a subscriber may maintain a variety of business card-like files providing data about the subscriber. At least a portion of each subscriber's user profile information may be located on the web server computer 207 within associated user web pages. For larger implementations, web server computer 207 could be accessed as a network drive by computer server 70. Preferably, computer server 70 would be responsible for creating sub-directories for each user in a predetermined directory within a storage device within web server computer 70. Each sub-directory may be labelled to correspond to a particular user of the graphical notification system 10. These sub-directories may be used to arrange web pages according to subscriber in a flat file format.

Alternatively, other directory structures may be used to manage the user-related web pages. For instance, one directory may be used wherein web documents such as HTML files are labelled according to associated users. Alternatively, another document description language may be used in place of HTML such as other derivatives of the Standard Generalized Markup Language (SGML), such as the Extensible Markup Language (XML). In another variation, a database structure may be used.

In the illustrative LAN architecture of FIG. 1 wherein both caller and called party are subscribers to the same graphical message notification system 10, retrieving the caller's identification information involves messaging server software 74 directing computer server 70 to access locally available records. It will be appreciated, however, that the present invention is not limited in its application to an environment wherein caller and called party are connected to the same local network or wherein caller and called party are subscribers to the messaging services of the same computer server 70. As illustrated in the embodiment in FIG. 10, a caller and called party may be located remote from each other on separate but interconnected networks which may be interposed by one or more other network infrastructures such as a WAN, PSTN network or the Internet. Furthermore, a caller and called party may be subscribers to separate but compatible messaging systems which can exchange recorded messages and caller identification information and which preferably both support graphical notification services. It will be appreciated that in order to leverage existing technologies, it is preferred that the graphical notification system of the present invention provide down-ward compatible services to support existing messaging services even when either of the caller or called party's messaging domain does not support graphical notifications. Such down-ward compatible support facilitates the convergence of messaging systems with the graphical message notification service of the invention.

In another variation, the call processing architecture may be separate from the messaging platform represented by graphical message notification system 10. For instance, messaging server software 74 may be deployed as an adjunct to a voice messaging server, rather than being integrated with the voice messaging server. In this latter case, a centralized identification database containing graphical information associated with users of graphical message notification system 10 may be connected to network 12. As messages are recorded by the voice messaging server, graphical message notification system 10 may record a reference to the recorded messages in appropriate user profiles within the centralized identification database. Terminal messaging software 112 on a user terminal periodically polls a messaging server, such as messaging server software 74 running on computer server 70, in search of new, unreviewed messages for a user. When such a message is detected, a reference to the message is added to a list of waiting messages. Terminal messaging software 112 then directs the terminal upon which software 112 resides to request graphical information associated with the source of the stored message from the centralized identification database. If such graphical information is found, it is used by messaging server software 74 to create a graphical message waiting notification for presentation via terminal messaging software 112 to the user to whom the message is addressed. Such a notification may be presented to the user as a business card with identification information pertaining to the source as well as information pertaining to the waiting message, such as the date and time the message was recorded. If the waiting message originated from a source that is not registered in the centralized identification database, a default graphic that denotes a call from an external source could be presented by messaging server software 74 to the user terminal for display along with textual identification information pertaining to the source and summary details regarding the stored message. The graphical message waiting notifications for such stored messages would be displayed on the user's terminal in, for example, a window of a graphical user interface or alternatively in a screen saver format for a dormant terminal.

Figure 12:
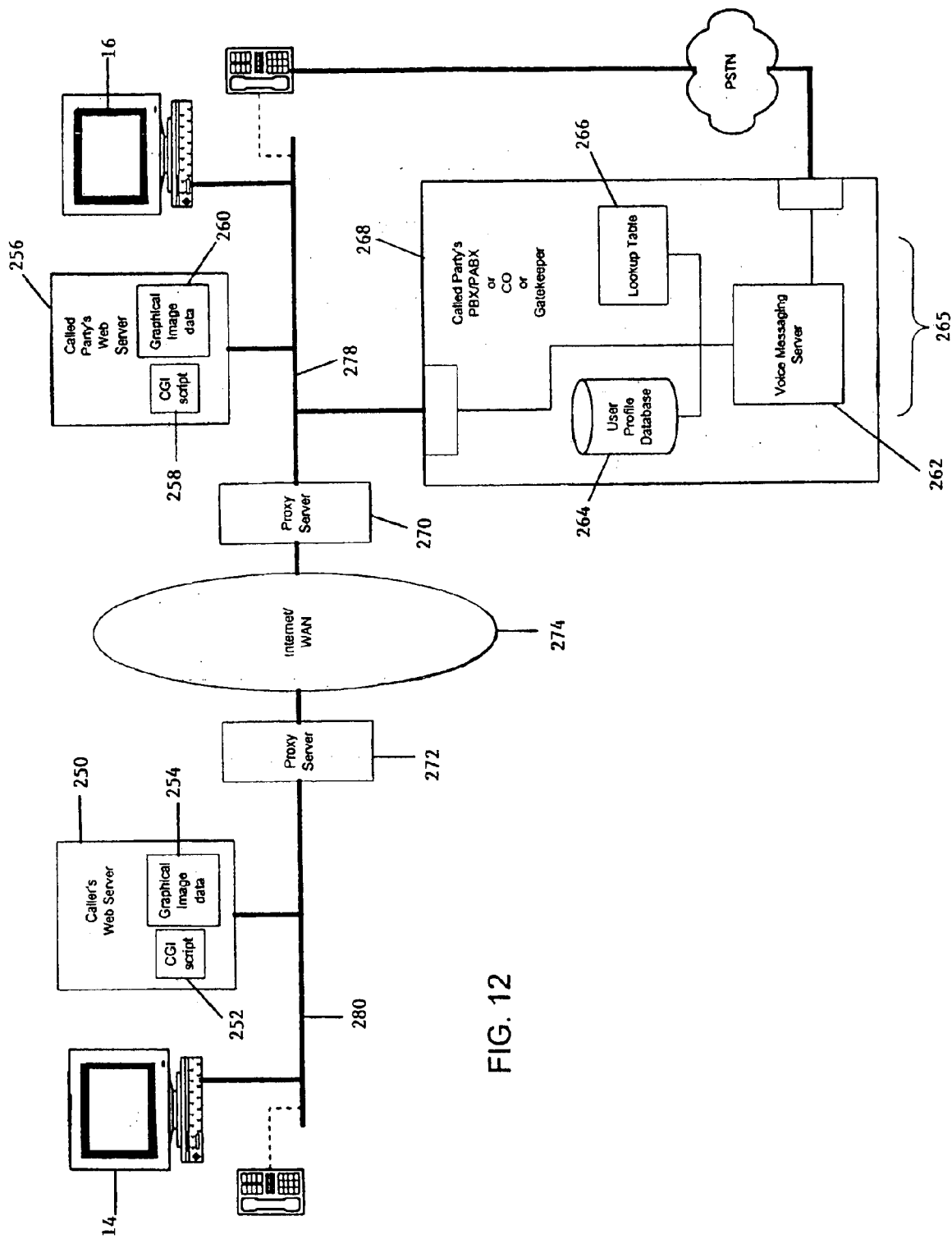
FIG. 12 is a block diagram of a first network architecture implementing a communications system according to a third embodiment of the invention.

Referring to FIG. 12, in another aspect of the invention, graphical information associated with a source or addressee of a communication is provided over a data network to the other party to the communication. In this aspect of the invention, graphical information associated with the source of the communication is provided to an addressee's end-user communications device via a web server or other network resource when a communication from a source is directed to the addressee's end-user communications device. Graphical information associated with the addressee may also be provided to the source of the communication.

In the illustrative embodiment in FIG. 12, the graphical caller identification system includes a caller web server 250 interconnected, directly or indirectly, to a called party web server 256, a messaging system 265 interconnected with called party web server 256, and end-user communications terminals 14 and 16 each having display devices. Web servers 250 and 256 may be similar in arrangement to web server computer 207 (in FIG. 10), may be web server software residing respectively on the caller and called party's communications devices, or may be web server software residing on respective computer servers within, or connected to, corresponding central offices or gatekeepers.

Messaging system 265 may be arranged similar to graphical notification system 10 (see FIGS. 1 and 5) so as to provide both messaging services and graphical notification services and, in addition, so as to provide graphical caller identification services. Alternatively, messaging system 265 can comprise a graphical call identification server operative to support graphical identification services and separately connected to a messaging server, such as a voice messaging server, capable of providing message recording services. In whichever variation is deployed, messaging system 265 preferably provides both graphical caller and called party identification.

Referring to FIGS. 12 to 15, a caller located at terminal 14 initiates a call to a called party via a network connection 280 using the voice over IP (VoIP) protocol defined by the International Telecommunications Union (ITU) H.323 specification. It will be appreciated by persons skilled in the art that H.323 is an umbrella recommendation from the ITU which provides a foundation for multimedia communications including audio, video and data communications across IP based networks such as local area networks and the Internet. H.323 includes a number of standardized protocols for handling call set up, call control, media control, and real-time data exchange.

The call (or call request) initiated from terminal 14 includes the IP address of the called party's service provider 268 which for illustration is a gatekeeper 268. The call request is routed at step 300 through network 274 and local area network 278 to gatekeeper 268 which looks up the IP address of the caller's web server 250 in lookup table 266 and retrieves caller identification such as the caller's name and phone number at step 302. It will be appreciated that in the embodiment shown, both the caller and the called party are subscribers to the same service provided by gatekeeper 268. In this case, user profiles for both the caller and called party, and IP addresses for their respective web servers and terminals, are stored locally within memory in gatekeeper 268.

At step 304, gatekeeper 268 retrieves the IP address of the called party's web server 256 from either a lookup table or from the called party's user profile within user profile database 264. Messaging server 262 is programmed to encode the called party's web server IP address, the caller's web server IP address, and the caller information into a web message such as an HTTP message which server 262 generates at step 306. Preferably, the HTTP message is generated as illustrated in FIG. 15, and includes instructions initiating operations by the called party's web server 256.

For instance, in the preferred embodiment in FIG. 12, the HTTP message includes the location of a common gateway interface (CGI) script residing on the called party's web server, with the caller information and the caller's web server IP address serving as query parameters for use by the CGI script when it is executed.

Once the HTTP message is generated, gatekeeper 268 sends the HTTP message to the called party's web server 256 where the message is executed, launching the called party's CGI script at step 308. The called party's CGI script includes codes instructing the called party's web server 256 to look up the local LAN IP address for the called party's terminal 16 via a local database. As a variation, the called party's web server 256 may be located on the called party's terminal 16, in which case the called party's web server 256 would preferably be accessed via the same IP address as the called party's terminal. Advantageously, for systems in which all terminals are provisioned with their own web server, the gatekeeper can look up the IP address of the called party's terminal and bypass the step of looking up the called party's web server IP address.

At step 310, the called party's CGI script instructs the called party's web server 256 to send, using TCP/IP, the caller information received from the HTTP message to the IP address of terminal 16. Preferably, when terminal 16 is notified of an arriving call at step 312, messaging software residing on terminal 16 displays the received caller information while retrieval of the caller's graphical information is processed. Retrieval of the additional caller information, including graphical information associated with the caller, is initiated at step 314 wherein the TCP/IP message from step 310 instructs the terminal messaging software or a web browser residing on terminal 16 to send an HTTP message or other firewall friendly message (such as FTP, gopher or the like) to the caller's web server 250 so as to initiate a CGI script 252 on web server 250. In a fashion similar to CGI script 258, upon receipt by the caller's web server 250 of the HTTP message from terminal 16, CGI script 252 is executed with parameters from the received HTTP message wherein the parameters identify requested caller information such as graphical image data 254. The requested caller information, including graphical image data 254, is retrieved by web server 250 under the handling of CGI script 252 at step 314 and transmitted back to terminal 16 as an HTTP message where it is parsed and the graphical image data associated with the caller is presented to terminal 16 for display on the associated display device. Thereafter, the call between caller and called party proceeds to completion with the called party having available on terminal 16 both caller line identification information and a digital representation of at least one graphical image associated with the caller.

In the latter embodiment, graphical information and other information associated with the caller is retrieved and presented to the called party. As in the aforementioned embodiment shown in FIG. 8 for graphical message waiting notification, however, graphical information and other subscriber information pertaining to the called party may be retrieved and presented to the caller at the time the caller initiates a call. Such called party information may be in a business card-like format and stored as web pages or documents as previously discussed above.

Figure 13:
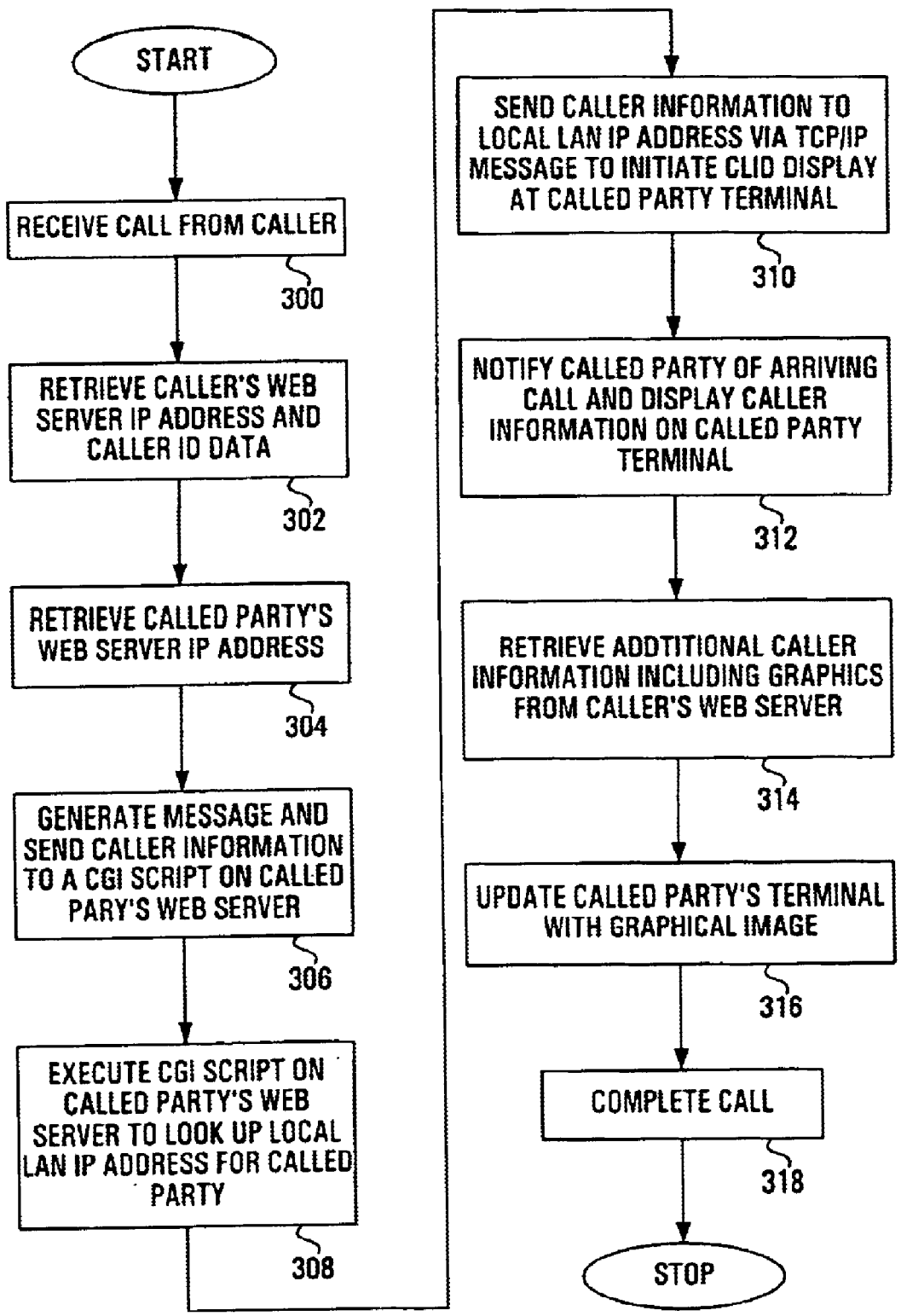
FIG. 13 is a flow diagram of operations executed by network resources of the embodiments shown in FIG. 12 or 17 to achieve graphical caller identification over a data network.

By way of example, in FIGS. 12 and 13, a caller initiating a call at step 300 may be a subscriber to such a service, in which case messaging server 262 may automatically initiate retrieval of the called party's graphical information from the appropriate networked resource upon receiving the call request from the caller. Preferably, once the called party's web server IP address is identified in step 304, an HTTP message may be sent to the called party's web server initiating a CGI script coded to direct the called party's web server to present to the caller's web server the appropriate graphical information associated with the called party.

As another variation, a call to the called party terminal 14 may be paused temporarily at gatekeeper 268 which initiates retrieval of the graphical image data associated with the caller in the aforementioned manner with the transmission of an HTTP transmission to CGI script 258. Once the caller graphical image data is delivered to terminal 16, the call setup may be allowed to proceed by gatekeeper 268 upon receipt by gatekeeper 268 of instructions to proceed from terminal 16. Advantageously, this embodiment offers a called party with visual call screening. In this variation, preferably the call times out in the event gatekeeper 268 does not receive instructions to terminate or process the call within a predetermined period of time.

In one variation, a subscriber terminal may include an interactive graphical activation software mechanism for directing the terminal to instruct the messaging server 262 to activate or deactivate graphical identification of the associated subscriber. Advantageously, this activation/deactivation feature has application both for calls as well as message recording. When deactivating graphical identification, the subscriber's terminal can be programmed to instruct messaging server 262 to deactivate the subscriber's graphical ID feature for a particular communication, for a particular recipient or until the messaging server 262 receives a activation signal from the subscriber's terminal.

In another variation of the embodiment shown in FIG. 12, messaging server 262 may provide a subscriber with the ability to pre-select particular graphical images for presentation to another subscriber during a communication depending upon the purpose or recipient of the communication. For instance, a subscriber may, via the subscriber's terminal device, pre-select a graphical picture of a monogrammed golf ball for communications with other subscribers about golf. Alternatively, a subscriber may pre-select another graphical picture to present during communications with specific other subscribers, such as family members or business colleagues. The selection of a graphical image may be performed by the subscriber's terminal explicitly with each communication, or may be set by default for all communications or for specific classes of communications or subscribers. For instance, a subscriber's terminal may include selection software which directs the subscriber's terminal, in response to user input, to reference graphical images associated with the subscriber to particular recipients stored in the subscriber's personal directory located on the terminal or on an accessible network resource. It will be appreciated, as with other variations herein, that the ability to pre-select or pre-assign subscriber-related graphical images for presentation in a communication also has application in graphical message waiting notification. Furthermore, as is the case with the calling party, the called party may also choose the particular graphical image to be presented to incoming callers either by default (for instance, for callers whom are not pre-assigned for presentation a graphical image associated with the called party), or by specific pre-association of called party graphical images with known callers stored in data files in the called party's personal directory.

In order to reduce delays in transactions, proxy servers 270 and 272 may be provided as network resources so as to each cache web page information concerning the called party web server 256 and the caller's web server 250, respectively. Moreover, lookup table information may be cached locally within a called party's messaging domain such as at the called party's messaging server or the called party's web server and may be flushed periodically or if the cached lookup table information generates erroneous IP addresses or phone numbers (as the case may be).

Furthermore, in Intranet and similar networks, call transactions may be performed via a single web server over the network which acts as the web server for both callers and called parties. Providing for a single web server eliminates the multiple network transactions which would otherwise be necessary between web servers as illustrated the description with respect to FIG. 12 above.

In yet another variation, preferably the CGI scripts residing on caller and called party web servers adhere to a standardized naming convention for ease of implementation. In another variation, rather than handling communication between called party's terminal 16 and caller's web server 250 using HTTP, communication is handled according to FTP or the like and requested caller information including graphical information from caller's web server 250 is delivered to terminal 16 as data files which are stored in RAM or permanent storage in terminal 16.

Figure 17:
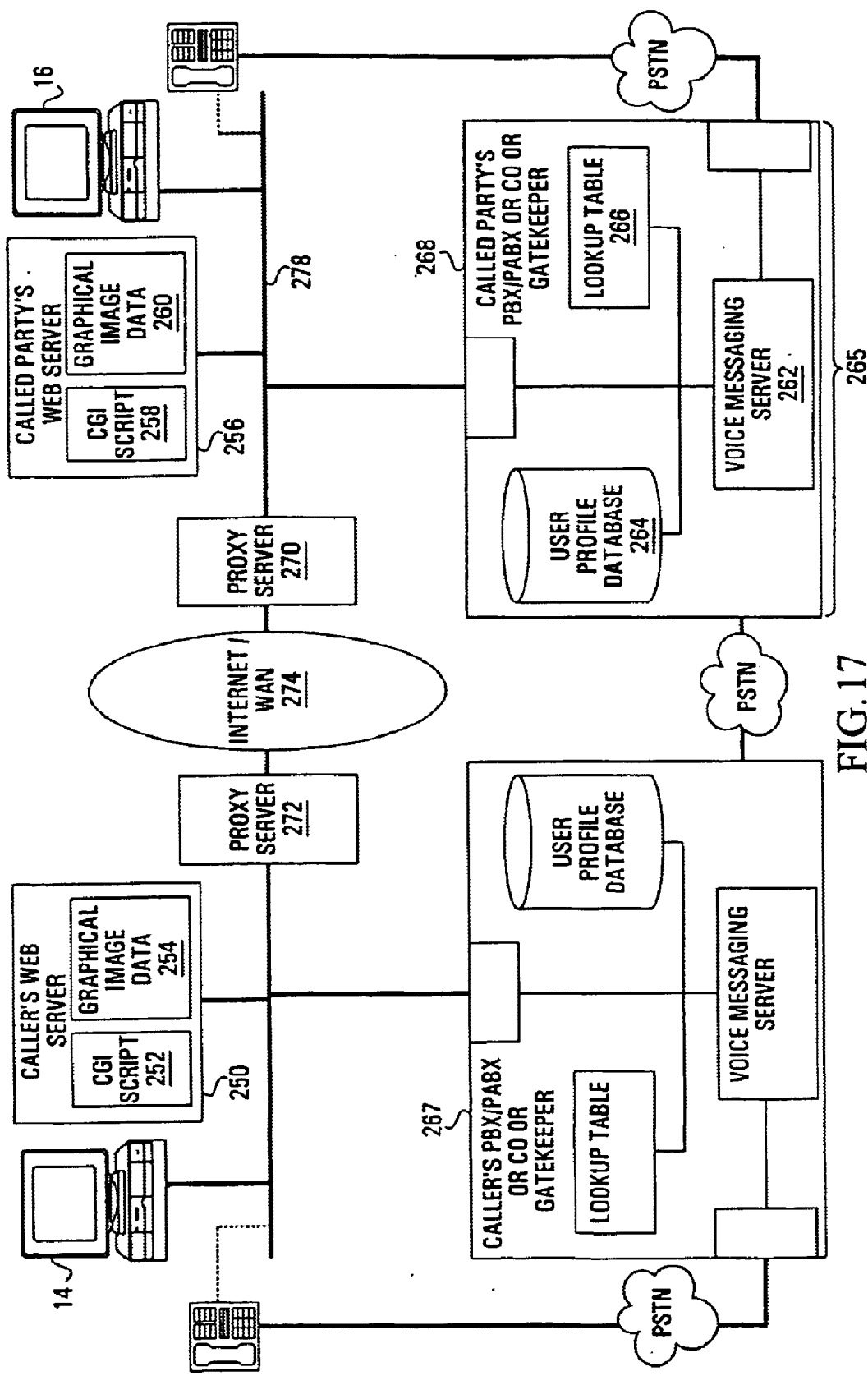
FIG. 17 is a block diagram of a second network architecture according to a fourth embodiment of the invention.

Referring to FIG. 17, there is shown another illustrative network architecture for use with the graphical caller identification system shown in FIG. 12. In FIG. 17, caller and called party are subscribers to separate messaging domains interconnected directly or via networks or subnetworks. In this case, a caller initiates a call from a PSTN connected telephone or from a networked phone or computer connected to the caller's central office 267. The initiated call is received by the caller's central office or PBX wherein the switching equipment thereof looks up the IP address of the called party's web server 256 as well as the IP address of the caller's web server 250. Preferably, the central office or PBX includes a computer server operative to generate an HTTP message addressed to the called party's web server 256 and including a call to CGI script 258 with parameters passing to the CGI script the IP address of the caller's web server 250 and caller information such as caller line ID information retrieved by the caller's local central office or PBX. The HTTP message is sent by the central office or PBX to the called party's web server 256 wherein the CGI script 258 referenced in the HTTP message is executed with the passed-in parameters included in the HTTP message. Processing then proceeds as described above with reference to FIG. 12. In another alternative, the caller's call may be passed over a PSTN network by the caller's local central office or PBX to the called party's central office or PBX. In this latter case, the called party's central office or PBX switching equipment looks up the IP address of the calling party's web server 256 and sends the HTTP message to web server 256.

In another variation, the web server architectures described above in respect of FIGS. 12 to 17 may also be implemented in the context of graphical message waiting notification described in respect of FIGS. 1 to 11. Advantageously, the same message handling techniques may be used with the same or similar CGI scripts. If, for instance, a call directed to terminal 16 in FIG. 12 does not connect, CGI script 258 directs the called party's web server 256 to pass a message to the messaging server 262 containing the URL of the caller's web server 250 and the caller ID. Upon receiving the message from web server 256, messaging server 262 requests from the caller's web server 250 the graphical and textual information associated with the caller if such information is not already available. Graphical and textual information associated with the caller and received from the caller's web server 250 is stored as a graphical notification in the called party directory on a web server local to network 278. Preferably, such graphical notifications are stored with unique names so that the name of a graphical notification may be used to correlate the graphical notification with the appropriate stored message. Stored messages are preferably stored on a storage device connected to messaging server 262 for retrieval by the called party's terminal 16. Terminal 16 may retrieve pending graphical notifications from the called party directory on the local web server (eg. called party web server 256) and requests for stored messages may be initiated using the CGI script of such a web server to initiate retrieval of selected messages from the message server 262.

In yet another variation, graphical message notification and graphical source and addressee identification services may be used with the Analog Display Services Interface (ADSI) protocol. For instance, an ADSI server may be connected to a central office associated with a voice messaging server. At the direction of the voice messaging server, the ADSI server may instruct the central office to send a message to the residential ADSI phone containing message waiting notification information including graphical information associated with the source of an incoming message. The called party's ADSI phone receives the graphical notification associated with the source of the incoming message and displays the information on a built-in display screen.

Although this invention has been described with reference to illustrative embodiments which are merely illustrative of a preferred embodiment of carrying out the invention, this description is not intended to be construed in a limiting sense. Various modifications of form, arrangement of parts, steps, details and order of operation of the illustrative embodiments, as well as other embodiments of the invention, will be apparent to persons skilled in the art upon reference to this description. For instance, the functionality provided by CGI scripts in the proceeding examples may also be provided by other mechanisms, such as Java Servlets, Server Side Includes (SSI) and other types of programs that can be invoked via command from a network. It is therefore contemplated that the appended claims will cover such modifications and embodiments as fall within the true scope of the invention.

What is claimed is:

1. A method of indicating a receipt of a stored message from a source, the method comprising:

generating an information signal relating the stored message to at least one graphical image associated with the source;

transmitting the information signal to a communications device associated with an addressee of the stored message; and indicating the receipt of the stored message in response to a receipt of the information signal by the communications device.

2. A method according to claim 1, including generating a representation of said at least one graphical image in the information signal.

3. A method according to claim 1, wherein said generating step includes:

identifying a network location where the at least one graphical image can be accessed by the addressee; and generating a representation of said network location in said information signal.

4. A method according to claim 3, including determining a network address identifying said network location.

5. A method according to claim 1, wherein said transmitting step includes transmitting said information signal for receipt by a network resource associated with the addressee.

6. A method according to claim 1, including receiving notification that the stored message has been received.

7. A method according to claim 1, including storing the information signal for subsequent retrieval and transmission to the communications device.

8. A method according to claim 1, wherein said generating step includes generating said information signal in response to receipt of a signal indicating that the stored message has been received.

9. A method according to claim 1, including determining the source of the stored message.

10. A method according to claim 9, wherein said determining step includes determining a calling party associated with the stored message.

11. A method according to claim 9, wherein said determining step includes determining caller line identification information associated with the stored message.

12. A method according to claim 9, including requesting, from a networked device associated with the source, source information for associating the source with the at least one graphical image.

13. A method according to claim 12, including receiving the source information from the networked device and producing the information signal in said generating step using the source information.

14. A method according to claim 13, including storing the source information after said receiving step in a centrally located network resource associated with the addressee.

15. A method according to claim 12, wherein the receiving step includes receiving the at least one graphical image from the network device.

16. A method according to claim 1, wherein said generating step includes associating the at least one graphical image with a subscriber of a messaging system.

17. A method according to claim 1, wherein said generating step includes identifying a media type of the stored message and generating a representation of the media type in the information signal.

18. A method according to claim 17, including requesting data identifying the media type of the stored message from a network device associated with a subscriber.

19. A method according to claim 17, including encoding into the information signal a graphical image associated with the media type of the stored message.

20. A method according to claim 17, including encoding into the information signal data relating the stored message with a graphical image associated with the media type of the stored message.

21. A method according to claim 1, including transmitting the stored message to a networked communications device in response to a request for the stored message from the networked communications device.

22. A method according to claim 1, wherein in said transmitting step the information signal is transmitted to the communications device of the addressee in response to receiving a request for pending notifications from the addressee.

23. A method according to claim 1, including providing the source with at least one graphical image relating to the addressee before recording the stored message.

24. A method according to claim 1, including producing in the information signal a digital representation of a sound waveform associated with the source.

25. A method according to claim 1, including retrieving a digital representation of a sound waveform associated with the source and encoding the digital representation of the sound waveform in the information signal before transmitting the information signal to the communications device.

26. A method according to claim 1, including generating within said information signal a representation of at least one video frame from a stream of video data associated with the source.

27. A method according to claim 1, wherein the stored message includes a stream of video data and said generating step includes producing within said information signal a representation of at least one video frame from the stream of video data.

28. A method according to claim 1, wherein the stored message includes a stream of video data and said generating step includes extracting the at least one graphical image from the stream of video data.

29. A method according to claim 1, including sending a control signal to a network resource for instructing the network resource to add at least a portion of the information represented within the information signal to a web page accessible to the communications device.

30. A method according to claim 29, including notifying the communications device of a pending notification on the web page.

31. A method according to claim 1, including receiving a caller line related signal identifying subscriber information associated with a caller line from which the stored message was received; and including at least a portion of the subscriber information in the information signal in said generating step.

32. A method according to claim 1, including relating the stored message to a pre-selected graphical image associated with the source and pre-selected by the source.

33. A method according to claim 1, including alerting the communications device that an incoming message from the source is being stored and permitting the communications device to interrupt the storage of the incoming message and connect with the source.

34. An apparatus for indicating a receipt of a stored message from a source, the apparatus comprising:
a generator configured to generate an information signal relating the stored message to at least one graphical image associated with the source;
a transmitter configured to initiate transmission of the information signal to a communications device associated with an addressee of the stored message; and
an indicator configured to indicate the receipt of the stored message in response to a receipt of the information signal by the communications device.

35. An apparatus according to claim 34, including a processor programmed to: (i) identify a network location where the at least one graphical image can be accessed by the addressee; and (ii) generate a representation of the network location within the information signal.

36. An apparatus according to claim 34, wherein said generator includes a message waiting notification server for producing the information signal.

37. An apparatus according to claim 34, including a processor programmed to initiate storage of at least a portion of the information within the information signal in a network resource.

38. An apparatus according to claim 34, including a computer server operative to communicate with a network resource where the at least one graphical image is stored.

39. An apparatus according to claim 38, wherein said transmitter is an integral component of said computer server.

40. An apparatus according to claim 34, including a receiver for receiving a request for a pending graphical notification from the addressee.

41. An apparatus according to claim 40, wherein said generator is programmed to process the request for a pending graphical notification.

42. An apparatus according to claim 41, wherein said transmitter is programmed to transmit the pending graphical notification to the communications device in the form of the information signal.

43. An apparatus according to claim 34, including a processor programmed to process a request from the communications device for the stored message.

44. An apparatus according to claim 34, including a processor programmed to process a representation of the at least one graphical image for inclusion in the information signal.

45. An apparatus according to claim 44, wherein said processor is programmed to generate the representation of the at least one graphical image.

46. An apparatus according to claim 44, wherein said processor is programmed to retrieve the representation of the at least one graphical image.

47. An apparatus according to claim 34, wherein said transmitter includes a processor programmed to instruct the communications device to add at least a portion of the information signal to a web page accessible to an end-user display device associated with the addressee.

48. An apparatus according to claim 34, wherein said generator includes a processor programmed to (i) identify a media type of the stored message, and (ii) include a digital image associated with the media type in the information signal.

49. An apparatus according to claim 34, including a processor programmed to reproduce within said information signal a representation of at least one video frame from a video stream associated with the source.

50. A system including the apparatus claimed in claim 34, and further comprising:
  a network computer operative to receive an incoming signal associated with the stored message and to initiate generation of the information signal with said generator in response to the incoming signal.

51. A system according to claim 50, wherein the network computer is programmed to communicate with the communications device via a network connection.

52. A system according to claim 51, including the communications device.

53. A system according to claim 52, wherein the communications device includes a processor programmed to 15 receive and display the at least one graphical image.

54. A system according to claim 53, wherein the processor is programmed to receive the at least one graphical image from the network computer.

55. A system according to claim 53, wherein the processor is programmed to: (i) retrieve from the information signal a network location identifying where the at least one graphical image can be accessed; and (ii) retrieve from a network device located at the network location the at least one graphical image for display to the addressee.

56. A computer readable medium including codes for:
  (a) directing a network computer to generate an information signal relating a stored message to at least one graphical image associated with a source of the stored message; and
  (b) directing the network computer to transmit the information signal to a communications device associated with an addressee of the stored message to indicate the receipt of the stored message.

57. A computer readable medium according to claim 56, wherein said codes include codes for directing the network computer to produce a representation of said at least one graphical image in the information signal.

58. A computer readable medium according to claim 56, wherein said codes include codes for directing the network computer to (i) identify a network location where the at least one graphical image can be accessed by the addressee, and (ii) generate a representation of said network location in the information signal.

59. A computer readable medium according to claim 56, wherein said codes include codes for directing the network computer to (i) retrieve a network address identifying a network location where the at least one graphical image can be accessed and (ii) provide the network address in the information signal.

60. A computer readable medium according to claim 56, wherein said codes include codes for directing the network computer to transmit the information signal to a network resource associated with the addressee.

61. A computer readable medium according to claim 56, including codes for directing the network computer to initiate storage of at least a portion of the information signal for subsequent retrieval and transmission to the communications device.

62. A computer readable medium according to claim 56, including codes for directing the network computer to determine the source of the stored message.

63. A computer readable medium according to claim 56, wherein said codes include codes for directing the network computer to determine a calling party associated with the stored message.

64. A computer readable medium according to claim 56, wherein said codes include codes for directing the network computer to determine a caller line associated with the stored message.

65. A computer readable medium according to claim 56, wherein said codes include codes for directing the network computer to: (i) identify a media type of a stored message, and (ii) produce a representation of a graphical image associated with the media type in the information signal.

66. A computer readable medium according to claim 56, including codes for directing the network computer to transmit the stored message to the communications device in response to a request for the stored message from the addressee.

67. A computer readable medium according to claim 56, wherein said codes include codes for directing the network computer to transmit the information signal to the communications device in response to the network computer receiving a request for pending notifications from the addressee.

68. A computer readable medium according to claim 56, including codes for directing the network computer to: (i) retrieve a digital representation of a sound waveform associated with the source, and (ii) encode the digital representation of the sound waveform in the information signal before transmission of the information signal to the communications device.

69. A computer readable medium according to claim 56, including codes for directing the network computer to reproduce within said information signal a representation of at least one video frame from a video stream associated with the source.

70. A computer readable medium according to claim 56, wherein said codes include codes for directing the network computer to: (i) transmit a control signal to a network resource for instructing the network resource to add at least a portion of the information represented in the information signal to a web page accessible to the communications device.

71. A computer readable medium according to claim 56, including codes for directing the network computer to relate the stored message to a pre-selected graphical image associated with the source and pre-selected by the source.

72. A computer readable medium according to claim 56, including codes for directing the network to alert the communications device that an incoming message from the source is being stored and permitting the communications device to interrupt the storage of the incoming message and connect with the source.

73. A method of indicating receipt of a stored message from a source, the method comprising:
  generating an information signal relating the stored message to at least one of: (i) a graphical image associated with the source; and (ii) a digital representation of a sound waveform associated with the source;
  transmitting the information signal to a communications device associated with an addressee of the stored message; and
  indicating the receipt of the stored message in response to a receipt of the information signal by the communications device.

74. A method according to claim 73, wherein said generating step includes relating, within the information signal, the stored message to a plurality of graphical images associated with the source.

75. A method according to claim 73, wherein said generating step includes relating, within the information signal, the stored message to a plurality of digital representations of sound waveforms associated with the source.

76. A method according to claim 73, wherein the stored message includes a stream of video data and said generating step includes producing within said information signal a digital representation of a plurality of video frames captured from the stream of video data so as to include within said information signal a video notification associated with the source.

77. A method according to claim 76, wherein the stream of video data includes audio data and wherein the digital representation of the at least one sound waveform is captured from said audio data.

* * * * *